United States Patent
Yamamoto et al.

(10) Patent No.: US 6,721,259 B1
(45) Date of Patent: Apr. 13, 2004

(54) OPTICAL HEAD AND RECORDING/REPRODUCING DEVICE

(75) Inventors: Kenji Yamamoto, Tokyo (JP); Kiyoshi Ohsato, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/582,155
(22) PCT Filed: Oct. 22, 1999
(86) PCT No.: PCT/JP99/05856
§ 371 (c)(1), (2), (4) Date: Jul. 11, 2000
(87) PCT Pub. No.: WO00/23841
PCT Pub. Date: Apr. 27, 2000

(30) Foreign Application Priority Data

Oct. 22, 1998 (JP) .......................................... 10/301480

(51) Int. Cl.[7] ................................................ G11B 7/00
(52) U.S. Cl. .................................................. 369/112.26
(58) Field of Search ........................... 369/47.36, 47.38, 369/47.4, 47.41, 47.49, 112.23, 112.24, 112.26, 112.27, 114, 115, 116, 53.23, 53.4

(56) References Cited

U.S. PATENT DOCUMENTS

| | | | |
|---|---|---|---|
| 5,568,325 A | | 10/1996 | Hirano et al. |
| 5,644,413 A | | 7/1997 | Komma et al. |
| 5,818,643 A | * | 10/1998 | Fujioka ...................... 359/637 |
| 5,966,362 A | * | 10/1999 | Arai et al. ............. 369/112.23 |
| 6,418,108 B1 | * | 7/2002 | Ueda et al. ............. 369/112.23 |

FOREIGN PATENT DOCUMENTS

| | | |
|---|---|---|
| EP | 0 709 606 | 8/1997 |
| JP | 9-197264 | 7/1997 ........... G02B/13/00 |

OTHER PUBLICATIONS

Patent Abstracts of Japan, JP 09–197264, Jul. 31, 1997.
Y. Fujioka, Optical Review, vol. 5, No. 1, pp. 109–114, Objective Lens System for Variable Thickness of Disk Base, Jan.–Feb. 1998.
Kenji Yamamoto et al., "0.8–Numerical–Aperture Two–Element Objective Lens for the Optical Disk", Japanese Journal of Applied Physics, Jan. 1997, vol. 36. Part 1, No. 1B, pp. 456–459, full text.
Yoshisato Fujioka, "Objective Lens System for Variable Thickness of Disk Base", Optical Preview, Mar./Apr. 1998, vol. 5, No. 2, pp. 109–114, full text.

* cited by examiner

Primary Examiner—Thang V. Tran
Assistant Examiner—Bach Vuong
(74) Attorney, Agent, or Firm—Oblon, Spivak, McClelland, Maier & Neustadt, P.C.

(57) ABSTRACT

An optical head comprising an objective lens having a large numerical aperture of 0.8 or more. The head further comprises a light source and an aberration-correcting lens group. To correct spherical aberration due to the manufacturing errors of an optical recording medium and lenses, to sufficiently correct chromatic aberration due to the use of a short-wavelength semiconductor laser and to correct aberration resulting from the use of the same optical system for light beams of different wavelengths, the objective lens 20 is composed of two more lenses and has a numerical aperture of 0.80 or more and the aberration-correcting lens group 1 is composed of a positive lens group 3 and a negative lens group 2. The space between the positive lens group 3 and negative lens group 2 of the aberration-correcting lens group 1 is changed, thereby to correct spherical aberration occurring at each optical surface of the optical system.

12 Claims, 21 Drawing Sheets

SPHERICAL ABERRATION

ASTIGMATISM

DISTORTED ABERRATION

LATERAL ABERRATION

LATERAL ABERRATION

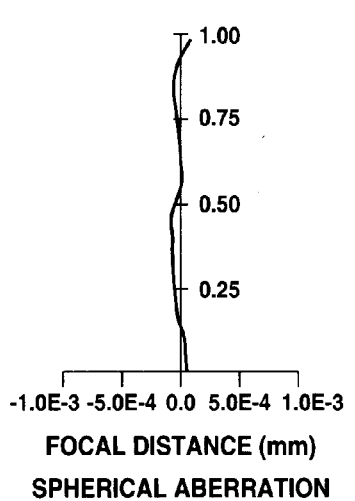
FOCAL DISTANCE (mm)
SPHERICAL ABERRATION
FIG.7A
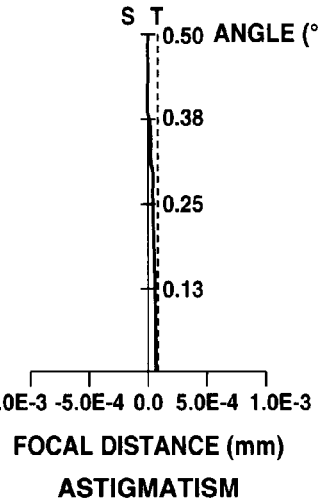
FOCAL DISTANCE (mm)
ASTIGMATISM
FIG.7B
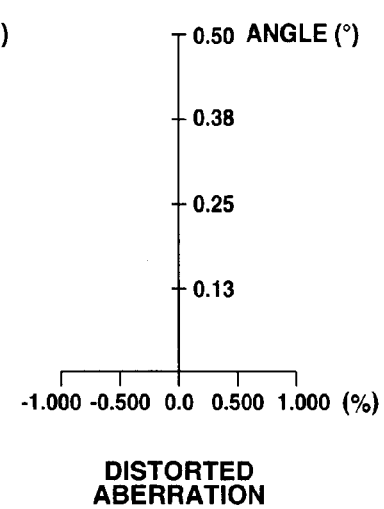
DISTORTED ABERRATION
FIG.7C
FIG.8A
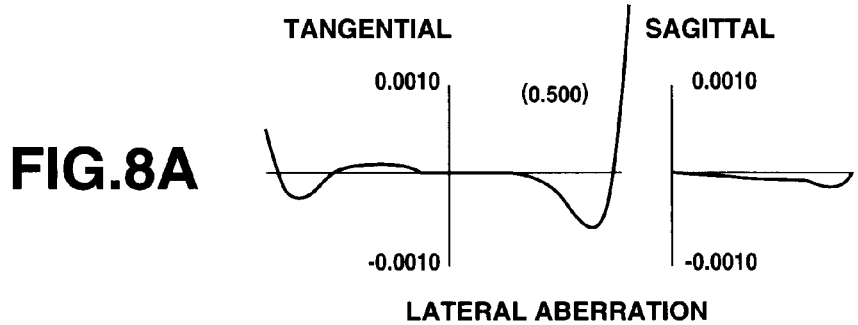
LATERAL ABERRATION
FIG.8B
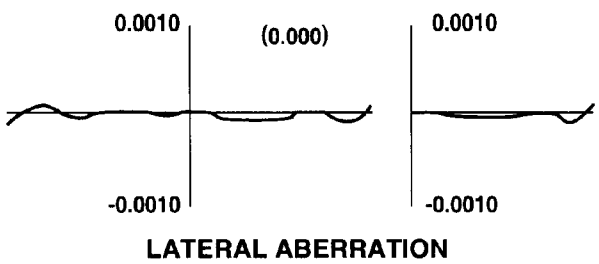
LATERAL ABERRATION

11 : PHASE-CHANGE OPTICAL DISK
30 : RECORDING/REPRODUCING APPARATUS

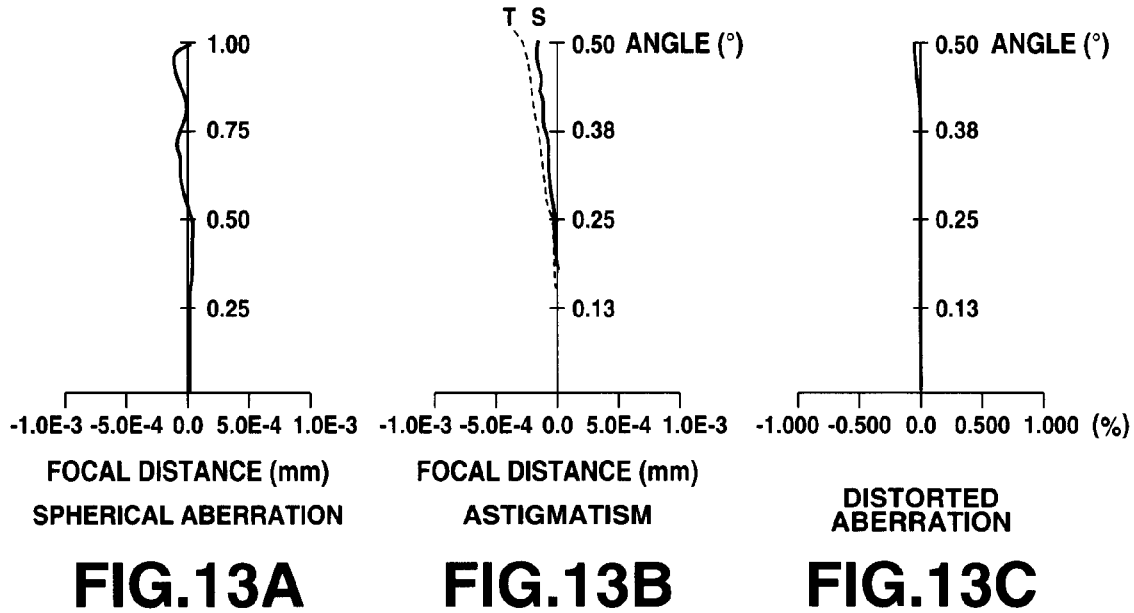
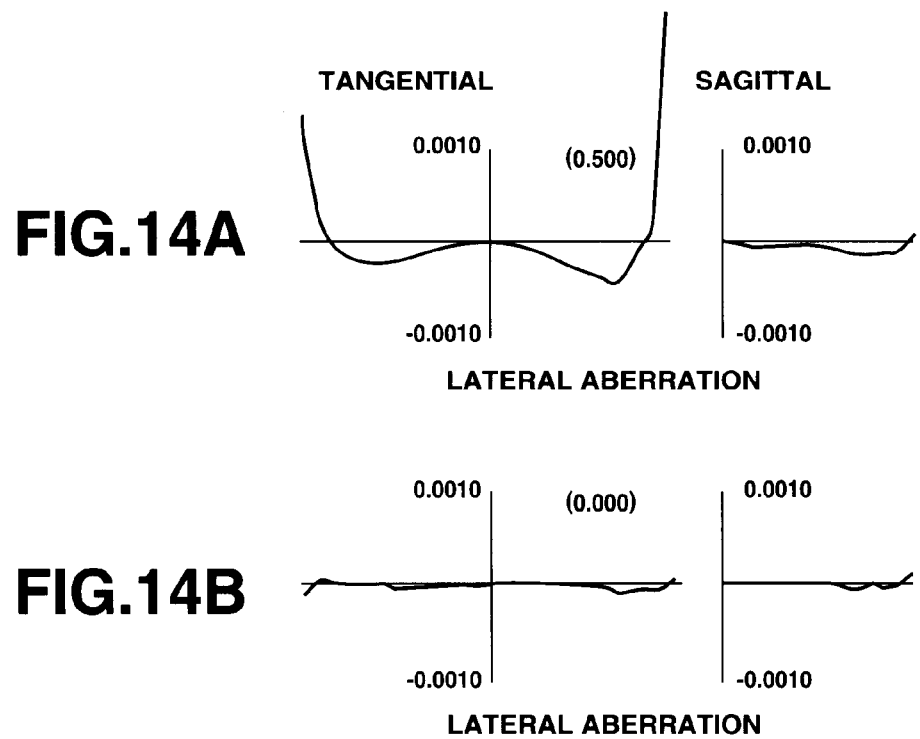

SPHERICAL ABERRATION

ASTIGMATISM

DISTORTED ABERRATION

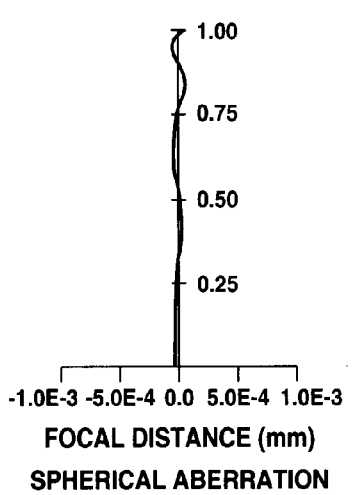
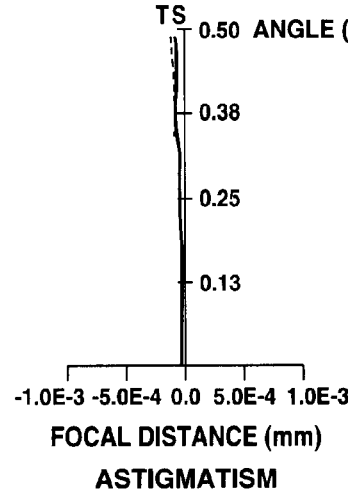
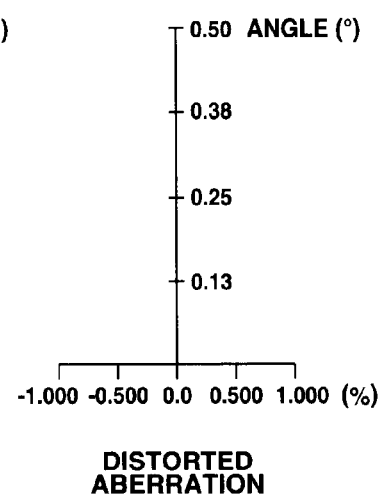
FIG.22A     FIG.22B     FIG.22C
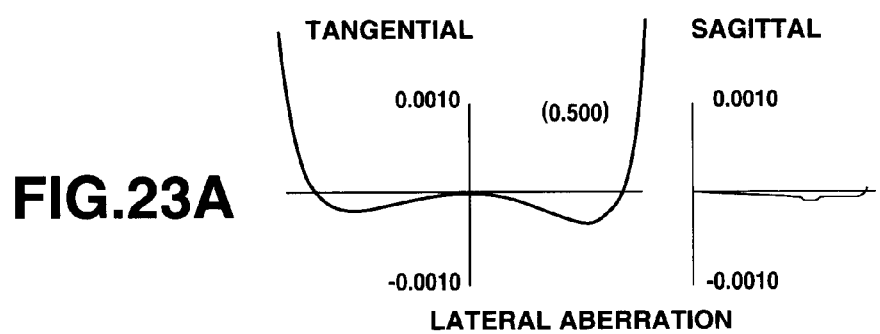
FIG.23A
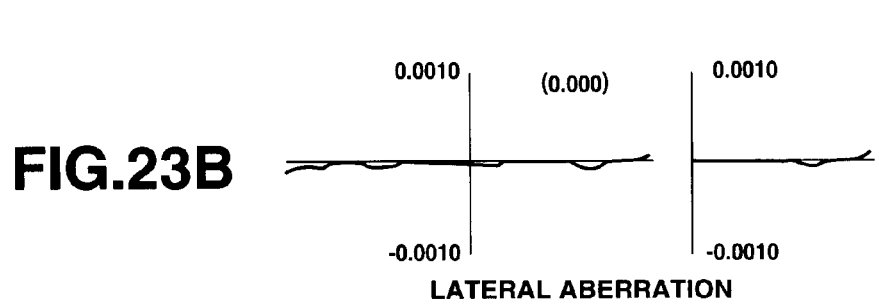
FIG.23B

OPTICAL HEAD AND RECORDING/REPRODUCING DEVICE

TECHNICAL FIELD

The present invention relates to an optical head for recording signals on, and reproduce signals from, an optical recording medium such as an optical disk. The invention also relates to a recording/reproducing apparatus having an optical head of this type.

BACKGROUND ART

Hitherto, various types of optical recording media have been proposed as recording media for data such as video data, audio data or computer programs. Among these media are a playback optical disk, a phase-change optical disk, a magneto-optical disk, an optical card and the like. In recent years, there is the increasing demanded that the recording density and storage capacity of these optical recording media be increased.

In order to increase the recording density of such optical recording media, some measure should be taken in an optical head designed to write and read data signals on and from such an optical recording medium. It is effective to increase the numerical aperture (NA) of the objective lens or shorten the wavelength of the light source, thereby to decrease the diameter of the beam spot formed as the objective lens converges a light beam. The numerical aperture of the objective lens is 0.45 and the wavelength of the light source is 780 nm for CDs (Compact Disks) (trademark), i.e., digital optical disk which were put to practical use in the relatively early stage of optical recording. For DVDs (trademark) i.e., digital optical disks on which data is recorded at higher density on CDs, the numerical aperture of the objective lens is 0.6 and the wavelength of the light source is 650 nm.

As mentioned above, it is desired that the recording density and storage capacity of these optical recording media be increased. Therefore, it is desirable to increase the numerical aperture of the objective lens to a value greater than 0.6 and to shorten the wavelength of the light source to a value less than 650 nm.

However, various problems will arise if the numerical aperture of the objective lens is increased and the wavelength of the light source is shorted in the optical head described above. These problems are spherical aberration and chromatic aberration, both being optical problems.

Spherical aberration may occur, mainly due to a manufacturing error in the thickness of the lens or in the thickness of the transparent substrate of the optical recording medium. In the case where the objective lens is composed of a plurality of lenses, the spherical aberration may occur due to an assembling error in the gaps among the lenses. As for the error in the thickness of the transparent substrate of the optical recording medium, for example, the three-dimensional spherical aberration resulting from the error in the thickness of the transparent substrate of a disk of "CD" standards or a disk of "DVD" recording is proportional to the fourth power of the numerical aperture (NA) of the objective lens as seen from the equation [1] given below. Therefore, the influence of the thickness error becomes prominent as the numerical aperture of the objective lens increases.

$$W_{40}=(t/8)\times(n^2-1)/n^2\times NA^4 \quad [1]$$

In the case of disks of the "CD" standards or a disk of the "DVD" standards, the manufacturing tolerances are of such values as to sufficiently reduce the spherical aberration resulting from the error in the thickness of the transparent substrate. In the manufacture of these disks, a specific technique is applied, setting the error in the thickness of the transparent substrate within a prescribed tolerance. It is, therefore, not necessary, in particular, to correct the spherical aberration in the optical system of the optical head. If the numerical aperture of the objective lens is further increased, however, the tolerance for the thickness error of the transparent substrate will become extremely small.

The thickness tolerance Δt for the substrate of, for example, the "DVD" standards is (0.03 mm. To maintain the same tolerance as this, the following relation expressed by the following equation [2] must be satisfied, as seen from the equation [1]:

$$dt \leq 0.00388/NA^4 \quad [2]$$

From this relation the thickness tolerance for the substrate of the disk may be obtained. The tolerance Δt is ±0.016 mm if the numerical aperture NA of the objective lens is 0.7, ±0.0095 mm if the numerical aperture NA of the objective lens is 0.8, and ±0.0074 mm if the numerical aperture NA of the objective lens is 0.85.

It is difficult, however, to raise the precision of the thickness of the disk substrate, because the error in the thickness of the substrate thickness depends on the method of forming the disk substrate. For the existing disk substrate it is difficult to reliably reduce the thickness error to 10 μm or less. If the disk substrate is produced in large quantities, the yield will be low. Hence, the substrate may not be fit for mass-production.

The error in the thickness of the lenses constituting the optical system of the optical head will be considered. For molded lenses it is difficult to reliably attain such a small thickness error as 10 μm or less. The thickness error of the lenses is almost equivalent to the thickness error of the transparent substrate, if it is regarded as the error in the optical path. In the case where the objective lens used has a large numerical aperture, the thickness error of the lenses will, like the thickness error of the transparent substrate, cause intolerable spherical aberration which would adversely influence the reproduced signals.

An objective lens having a large numerical aperture of 0.8 or more needs to be composed of a plurality of lenses. Even if the spacers made of synthetic resin or metal, which are interposed between the lenses, are process with high precision, it will be difficult to decrease the error in the gap between each lens and another to 10 μm or less. Such an error in the gap between any two adjacent lenses of the objective lens may cause spherical aberration, like die thickness error of the transparent substrate of the optical recording medium. The gap error therefore adversely influences the signals.

In consideration of the spherical aberration occurring in the optical recording medium and in the optical head, it is virtually difficult to reduce the spherical aberration, in terms of the thickness error of the transparent substrate of the medium, to 10 μm or less in the case where use is made of an optical system that comprises an objective lens having a numerical aperture of 0.8 or more and composed of a plurality of lenses.

If a semiconductor laser that exhibits a short emission wavelength is used, the problem of spherical aberration will arise, too. It is desired that not only spherical aberration, but also chromatic aberration be corrected.

DISCLOSURE OF THE INVENTION

The present invention has been made in consideration of the foregoing. The object of this invention is to provide an optical head comprising an objective lens composed of a plurality of lenses and having a numerical aperture of 0.8 or more, in which the spherical aberration resulting from the manufacturing errors of the optical recording medium and the lenses, and the chromatic aberration resulting from a semiconductor laser, if used as the light source of the optical head, is sufficiently decreased. Further, the invention aims to reduce the spherical aberration that occurs when the same optical system is used to light beams having different wavelengths.

Another object of this invention is to provide a recording/reproducing apparatus comprising such an optical head as described above, in which the recording density and storage capacity of an optical recording medium can be enhanced and increased.

As indicated above, it is extremely difficult to suppress the manufacturing error of the optical components so much as to reduce the spherical aberration to a negligible degree in an optical system that comprises an objective lens composed of a plurality of lenses and having a numerical aperture (NA) of 0.8 or more. It is desired that some measures be taken to cancel the spherical aberration that results from the manufacturing error of the optical components.

The spherical aberration in the optical system can be given as the sum of the aberrations occurring at the optical surfaces. Thus, the spherical aberration resulting from the manufacturing error of the optical components can be corrected by arranging optical components that cause spherical aberration of the opposite sign somewhere on the optical path extending from the light source to the optical recording medium.

The optical system of the optical head according to this invention has a group of aberration-correcting lenses. These lenses generate spherical aberration of the sign opposite to that of the spherical aberration generated at the optical surfaces in the optical system, when data signals are written on, or read from, the optical recording medium. The aberration-correcting lenses consist of two lens groups, i.e., a positive lens group a negative lens group which are spaced from each other. It is sufficient if these lens groups are respectively positive and negative in terms of power. Each lens group may consist of a single lens or a plurality of lenses.

The aberration-correcting lenses, which consist of these two lens groups, are arranged between the light source and the objective lens. The space between the lens groups is moved in the optical axis of the optical system, thus generating spherical aberration that is opposite in polarity to the spherical aberration generated in the entire optical system, with respect to the wave front of the light beam passing through the objective lens.

In the optical head, the spherical aberration is therefore cancelled at the wave front of the light beam emitted from the light source, transmitted through the objective lens and focused. As a whole, the optical system is a system in which the spherical aberration is corrected well.

Assume that the transparent substrate of the optical recording medium has a thickness error dt. Then the following equation [3] derives from the equation [1]:

$$dw_{40}=(dt/8)\times(n^2-1)/n^3\times NA^4 \qquad [3]$$

Hence, positive spherical aberration will occur if the transparent substrate of the optical recording medium has a large thickness error, and negative spherical aberration will occur if the transparent substrate of the optical recording medium is thin. To cancel the spherical aberration, it suffices to adjust the space between the groups of aberration-correcting lenses and generate negative spherical aberration if the transparent substrate is thick or positive spherical aberration if the transparent substrate is thin.

The spherical aberration generated by adjusting the space between the aberration-correcting lens groups, which are arranged between the light source and the objective lens, has negative polarity if the space between the lens groups is decreased or positive polarity if the space is increased. This holds true unless the light beam at the position where the aberration-correcting lens groups are provided is a converging or diverging one that can hardly be used in the optical system of an optical head.

That is, when the space between the lens groups is decreased, the light beam emitted diverges more than before, making the spherical aberration smaller than in the case the transparent substrate of the optical recording medium is thick. When the space between the lens groups is increased, the light beam emitted converges more than before, rendering the spherical aberration smaller than in the case where the transparent substrate of the optical recording medium is thin. The polarity of spherical aberration remains unchanged even if the positive lens group and the negative lens group are exchanged in position. Hence, it does not matter which lens group is arranged before the other lens group.

The actual optical system has manufacturing errors other than the thickness error of the transparent substrate of the optical recording medium. The space between the aberration-correcting lens groups is therefore adjusted to attain the best possible conditions, while the RF amplitude of the signal reproduced is being monitored.

In an optical head of this type, the larger the numerical aperture of the objective lens, the greater the spherical aberration generated by the manufacturing error of the objective lens or the manufacturing error of the optical recording medium. With the present invention, however, the spherical aberration can be reduced sufficiently even if the manufacturing error is prominent or even if the r refractive indices or absolute lengths of the various optical elements vary due to the environmental changes. This is because the groups of aberration-correcting lenses are arranged between the light source and the objective lens in the present invention.

As the means for adjusting the space between the groups of aberration-correcting lenses, thereby may be used an actuator of so-called voice-coil type, a piezoelectric actuator or the like.

A recording/reproducing apparatus according to the present invention comprises such an optical head as described above. It is designed to record data signals on an optical recording medium and to reproduce data signals therefrom.

As a special solution, the aberration-correcting lens group may function not only as means for correcting spherical aberration but also as collimator lenses, in the optical head according to this invention. In this case, the number of components can be decreased, thereby to reduce the time and labor required for manufacturing the optical head and, ultimately, to lower the manufacturing cost of the optical head. As another special solution, the aberration-correcting lens group may be arranged between a collimator lens and an objective lens. If this is the case, a beam splitter, an anamorphic prism or the like can be easily arranged, together with the aberration-correcting lens group, in the path of the light beam emitted from the collimator lens. This is because the light beam emitted from the collimator lens is a parallel beam.

An aberration-correcting lens group and an anamorphic prism may be used together in the optical head according to this invention. If so, it is desired that the aberration-correcting lens group be arranged between the anamorphic prism and the objective lens. This is because, if the anamorphic prism is arranged between the objective lens and the aberration-correcting lens group, the incident angle of the light beam to the anamorphic prism will change, inevitably causing astigmatism. In order to prevent such astigmatism from occurring, it is desirable to locate the aberration-correcting lens group at the output side of the anamorphic prism.

The optical system of the optical head according to the present invention may comprise a plurality of lenses and an objective lens having a large numerical aperture of 0.80 or more. If this is the case, the optical system is structured, effectively to correct the spherical aberration caused by that objective lens. This is because, the larger the numerical aperture and the shorter the wavelength used, the worse the spherical aberration in the optical system, and also because an objective lens composed of a plurality of lenses and possessing a large numerical aperture is likely to have large manufacturing errors.

Moreover, in the optical system of the optical head according to the invention, the light source may be a semiconductor laser having an emission wavelength of 440 mm or less and the objective lens may comprise two lens group, have a numerical aperture of 0.80 or more, have a focal distance of 1.4 mm or more and be made of vitreous material whose d line has an Abbe number of 95.0 or less. In this particular case, it is desirable that each lens group should be composed of two lenses, one being a positive lens that has an Abbe number of 55 or more and the other being a negative lens that has an Abbe number of 35 or less.

In the case where a short-wave beam is utilized, chromatic aberration may become a problem. Nonetheless, spherical aberration and chromatic aberration can be corrected altogether if the aberration-correcting lens constituting the group are made of vitreous material having the above-specified Abbe number. The structure that corrects both the spherical aberration and the chromatic aberration in the case where a short-wave beam is used will be described later.

The aberration-correcting lens group provided in the optical system of the optical head according to the invention has a considerably small numerical aperture. The spherical aberration generated by moving the lens group in the optical axis is, therefore, mainly of third order. By contrast, the spherical aberration caused by the thickness-manufacturing errors of the objective lens and transparent substrate includes high-order aberration, inevitably because the objective lens has a large numerical aperture. Consequently, the aberration-correcting lens group cannot completely cancel the spherical aberration that has resulted from the thickness-manufacturing errors of the objective lens and transparent substrate. Thus, the spherical aberration must be further corrected if the aberration-correcting lens group corrects fails to completely cancel the spherical aberration resulting from the thickness-manufacturing errors of the objective lens and transparent substrate and there remains some aberration.

In the optical system, light beams of different wavelengths may be applied, in which case it is necessary to cancel the aberration resulting from the difference in wavelength among these light beams. This aberration can be canceled by virtue of the spherical-aberration correcting effect that aberration-correcting lens group has. However, the aberration resulting from the wavelength difference may not be canceled completely because it includes high-order aberration, depending upon the type of the aberration-correcting lens group used.

In the case where the objective lens comprises two lens groups, each consisting of two or more lenses, the space between the lens groups may be changed to generate spherical aberration, in the same principle as applied to the aberration-correcting lens groups described above. Thus, the spherical aberration generated by changing the space between the aberration-correcting lens groups may be combined with the spherical aberration generated by changing the space between the lens groups constituting the objective lens. This makes it possible to correct spherical aberration of a higher order.

BRIEF DESCRIPTION OF THE DRAWINGS

FIG. 7A is a graph illustrating the spherical aberration occurring in the optical system shown in FIG. 6;

FIG. 7B is a graph illustrating the astigmatism occurring in the optical system shown in FIG. 6;

FIG. 7C is a graph illustrating the distorted aberration occurring in the optical system shown in FIG. 6;

FIG. 8A is a graph represents the lateral aberration occurring at an angle of field of 0.5° in the optical system shown in FIG. 6;

FIG. 8B is a graph showing the lateral aberration on the optical axis of the optical system shown in FIG. 6;

FIG. 13A is a graph illustrating the spherical aberration occurring in the optical system (of Embodiment 1);

FIG. 13B is a graph illustrating the astigmatism occurring in the optical system (of Embodiment 1);

FIG. 13C is a graph illustrating the distorted aberration occurring in the optical system (of Embodiment 1);

FIG. 14A is a graph represents the lateral aberration occurring at an angle of field of 0.5° in the optical system (of Embodiment 1);

FIG. 14B is a graph showing the lateral aberration on the optical axis of the optical system (of Embodiment 1);

FIG. 22A is a graph illustrating the spherical aberration occurring in the optical system (of Embodiment 3);

FIG. 22B is a graph illustrating the astigmatism occurring in the optical system (of Embodiment 3);

FIG. 22C is a graph illustrating the distorted aberration occurring in the optical system (of Embodiment 3);

FIG. 23A is a graph represents the lateral aberration occurring at an angle of field of 0.5° in the optical system (of Embodiment 3);

FIG. 23B is a graph showing the lateral aberration on the optical axis of the optical system (of Embodiment 3);

BEST MODE FOR CARRYING OUT THE INVENTION

Specific embodiments of the present invention will be described in detail, with reference to the accompanying drawings.

Optical System

Figure 1:
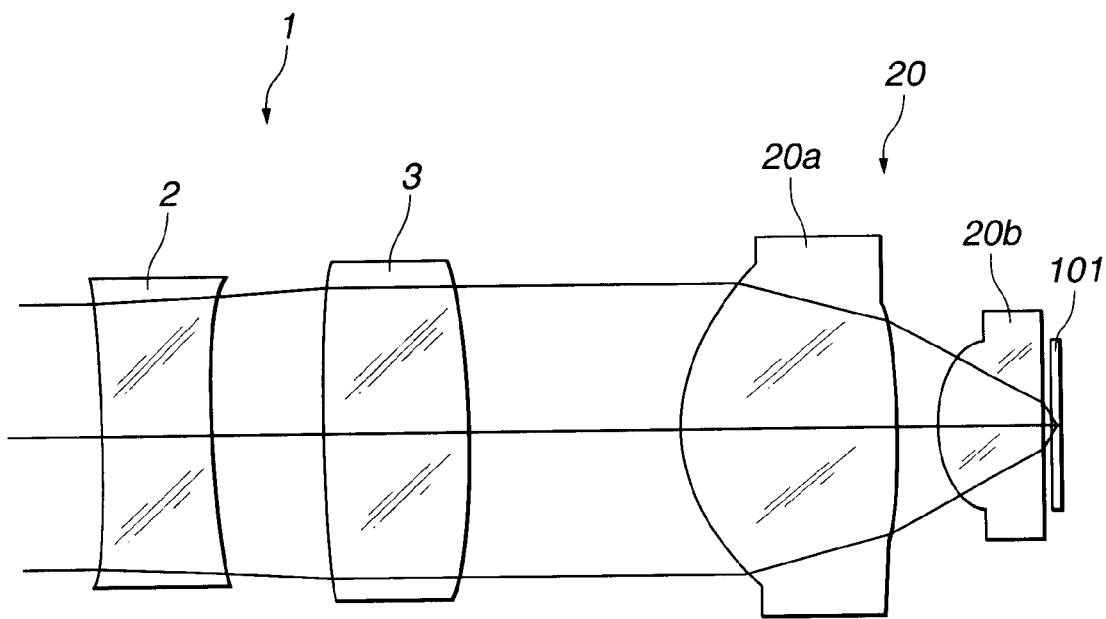
FIG. 1 is a side view showing the optical system of an optical head according to the present invention.

As shown in FIG. 1, the optical system of an optical head according to this invention comprises an aberration-correcting lens group 1. Table 1 presented below shows the design values of this optical system.

TABLE 1

| | Objective lens NA/Focal distance/ Entrance pupil φ (0.85/2.353 mm/4.00 mm) | | | Wavelength λ = 635 nm | |
| --- | --- | --- | --- | --- | --- |
| Surface | Radius of curvature (mm) | | Axial interval (mm) | Flexion rate Nd/Abbe number νd at d line | Flexion rate N at 635 nm |
| OBJ | ∞ | | ∞ | | |
| STO | ∞ | | 0.0 | | |
| S1 | R: −25.0 | C: 0.0 | 1.6 | 1.620/36.3 | 1.616405 |
|  | K: 0.0 | D: 0.0 | | | |
|  | A: 0.0 | E: 0.0 | | | |
|  | B: 0.0 | F: 0.0 | | | |
| S2 | R: 17.055 | C: 0.0 | 1.521325 | | |
|  | K: 0.0 | D: 0.0 | | | |
|  | A: 0.0 | E: 0.0 | | | |
|  | B: 0.0 | F: 0.0 | | | |
| S3 | R: 19.00 | C: 0.0 | 2.0 | 1.51633/64.1 | 1.515014 |
|  | K: 0.0 | D: 0.0 | | | |
|  | A: 0.0 | E: 0.0 | | | |
|  | B: 0.0 | F: 0.0 | | | |
| S4 | R: −19.00 | C: 0.0 | 3.0 | | |
|  | K: 0.0 | D: 0.0 | | | |
|  | A: 0.0 | E: | | | |
|  | B: 0.0 | F: | | | |
| S5 | R: 2.46917 | C: −.55616 × $10^{-5}$ | 2.962612 | 1.4955/81.6 | 1.494122 |
|  | K: −0.177274 | D: −.991159 × $10^{-5}$ | | | |

TABLE 1-continued

| | | Objective lens NA/Focal distance/ Entrance pupil φ (0.85/2.353 mm/4.00 mm) | | | Wavelength λ = 635 nm | |
|---|---|---|---|---|---|---|
| Surface | | Radius of curvature (mm) | | Axial interval (mm) | Flexion rate Nd/Abbe number vd at d line | Flexion rate N at 635 nm |
| S6 | A: −.353215 × 10⁻² B: −.452433 × 10⁻³ R: −12.58525 K: −13.032252 A: 0.3707368 × 10⁻² B: 0.799138 × 10⁻⁴ | E: −.128023 × 10⁻⁷ F: −.159371 × 10⁻⁶ C: 0.242782 × 10⁻³ D: −.981829 × 10⁻⁴ E: −.324027 × 10⁻⁴ F: 0.162258 × 10⁻⁴ | | 0.505533 | | |
| S7 | R: 1.25 K: 0.0 A: 0.0 B: 0.0 | | C: 0.0 D: 0.0 E: F: | 1.495535 | 1.51633/64.1 | 1.515014 |
| S8 | | ∞ | | 0.0 | | |
| S9 | | ∞ | | 0.098295 | | |
| S10 | | ∞ | | 0.1 | | 1.5295 |
| S11 | | ∞ | | 0.0 | | |
| IMG | | ∞ | | 0.0 | | |

The aspherical shape is defined by the following equation [4]. This holds true for Table 2 to Table 5, which will be presented later.

Equation of Spherical Surface $$X = \frac{Y^2/R}{1 + \{1 - (1+K)(Y/R)^2\}^{1/2}} + AY^4 + BY^6 + CY^8 + DY^{10} + EY^{12} + FY^{14}$$

where:

X: Depth from the apex of the surface
Y: Height from the optical axis
R: Para-axis R
K: Cone constant
A: Aspheric-surface coefficient of term $Y^4$
B: Aspheric-surface coefficient of term $Y^6$
C: Aspheric-surface coefficient of term $Y^8$
D: Aspheric-surface coefficient of term $Y^{10}$
E: Aspheric-surface coefficient of term $Y^{12}$
F: Aspheric-surface coefficient of term $Y^{14}$
[4]

The optical system is used to record data signals on and reproduce data signals from optical recording media such as an optical disk, a phase-change optical disk, an optical card and the like. These optical recording media have a transparent substrate 101 each. That surface of the transparent substrate 101, which faces away from the optical system is the signal-recording surface. The aberration-correcting lens group 1 is composed of a first lens 2 and a second lens 3 and is designed to correct the spherical aberration occurring in the optical system. An objective lens 20 is provided, which is composed of two lenses 20a and 20b.

In Tables 1 and Tables 2 to 5, to be presented later, OBJ denotes an object point, STO designates an aperture diaphragm, S1, S2, S3, indicate the surfaces of the lenses, in the order the lenses are arranged, and IMG denotes the recording surface of the optical recording medium, i.e., the image-forming surface.

Figure 2A:
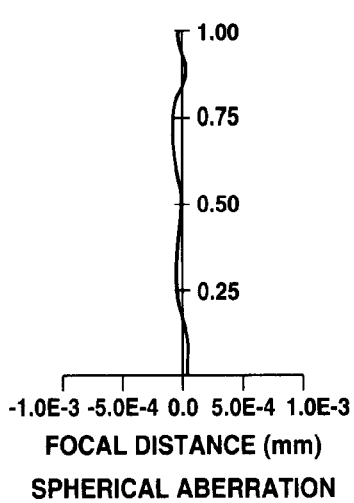
FIG. 2A is a graph illustrating the spherical aberration occurring in the optical system shown in FIG. 1.
Figure 2B:
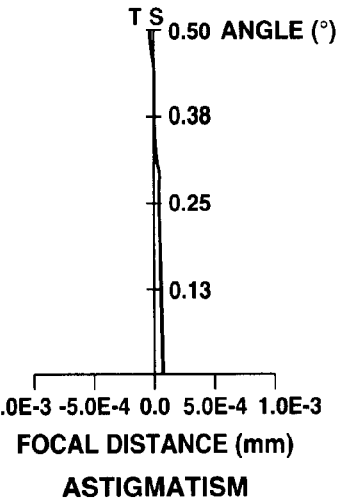
FIG. 2B is a graph illustrating the astigmatism occurring in the optical system shown in FIG. 1.
Figure 2C:
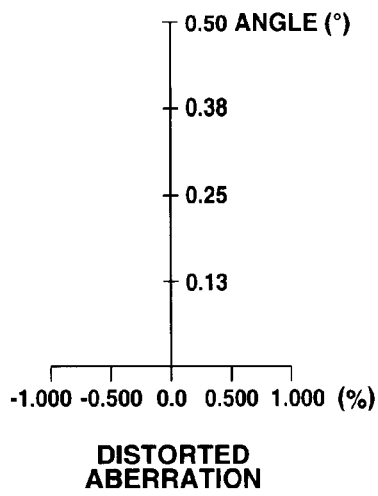
FIG. 2C is a graph illustrating the distorted aberration occurring in the optical system shown in FIG. 1.
Figure 3A:
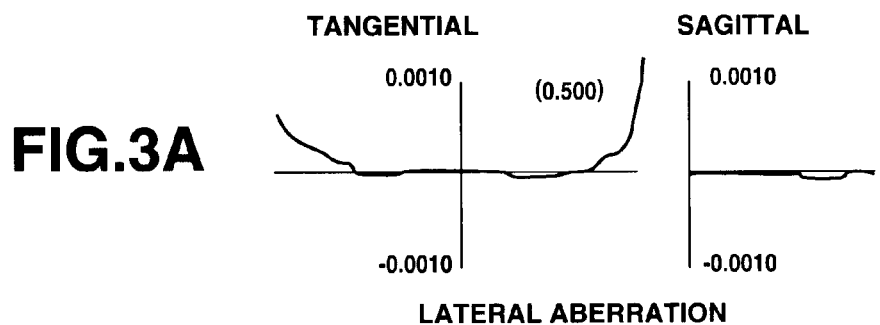
FIG. 3A is a graph represents the lateral aberration occurring at an angle of field of 0.5° in the optical system shown in FIG. 1.
Figure 3B:
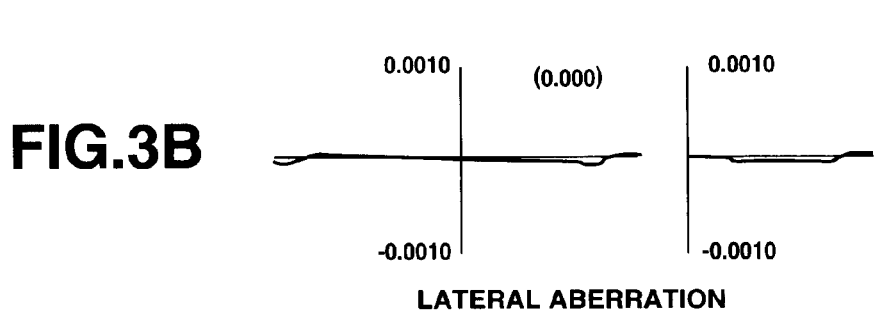
FIG. 3B is a graph showing the lateral aberration on the optical axis of the optical system shown in FIG. 1.

The spherical aberration in the optical system is shown in FIG. 2A, the astigmatism in the system is illustrated in FIG. 2B, and the distorted aberration in the system is shown in FIG. 2C. Further, the lateral aberration occurring at an angle of field of 0.5° in the system is shown in FIG. 3A, and the lateral aberration on the optical axis of the system is illustrated in FIG. 3B.

The optical system shown in FIG. 1 is a so-called infinite system, in which an object point is located at an infinite distance. The aberration-correcting lens group 1 is arranged between a light source (not shown) and the objective lens 20. The group 1 comprises the first lens 2 and the second lens 3. The first lens 2 is a biconcave lens and located near the light source. The second lens 3 is a biconvex lens and located near the objective lens 20. Nothing but air exists between the first lens 2 and the second lens 3.

The optical system comprises means for adjusting the space between the first and second lenses 2 and 3 of the aberration-correcting group 1. The means, for example, a uniaxial solenoid actuator, is connected to the first lens 2 or the second lens 3. The aberration-correcting lens group 1 generates spherical aberration as the space between the lenses 2 and 3 is adjusted. The spherical aberration, thus generated, has the polarity that is opposite to that of spherical aberration occurring at another optical surface. Hence, the spherical aberration and the spherical aberration occurring at another optical surface cancel each other at the focal point. As a result, the entire spherical aberration in the optical system can be corrected well.

The aberration-correcting lens group 1 has a considerably small numerical aperture, however. The spherical aberration generated as the lenses 2 and 3 are moved in the optical axis is, therefore, of mainly the third order. On the other hand, the spherical aberration resulting from the thickness-manufacturing errors of the objective lens 20 and transparent substrate 101 includes high-order aberration. This is because the objective lens 20 has a large numerical aperture. Thus, the aberration-correcting lens group 1 alone cannot completely cancel the spherical aberration. In order to minimize the root mean square of the spherical aberration, it is necessary to determine the movement of the aberration-correcting lens group 1. In practice, a ray-tracking method is employed, calculating the OPD of the main light beam and the OPD of the ambient light beams. The lenses 2 and 3 are set at such positions as to minimize the difference between the OPDs calculated, i.e., the root mean square of the spherical aberrations.

Figure 4:
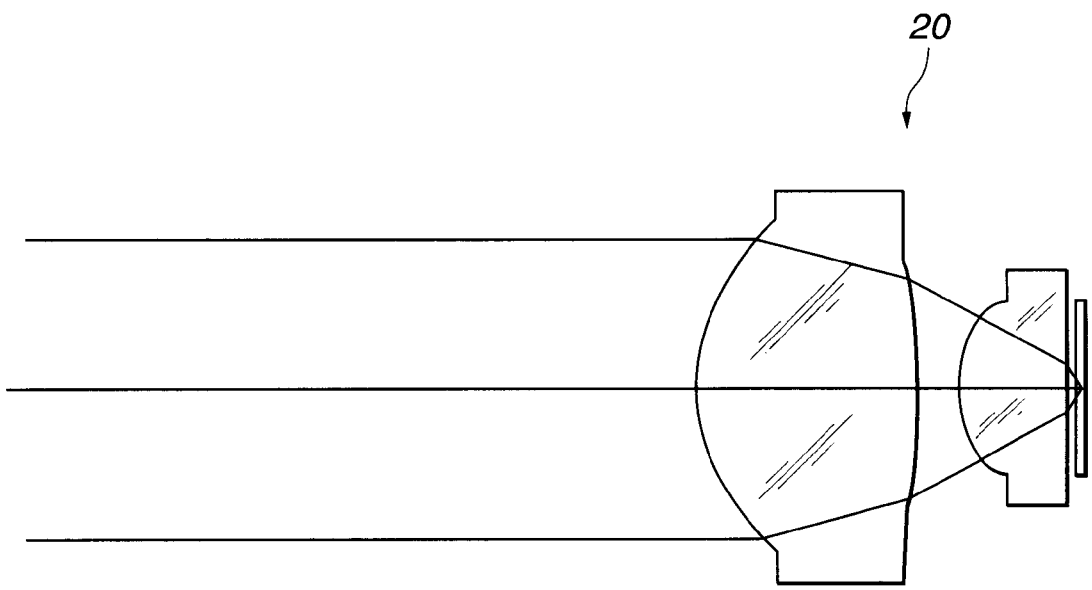
FIG. 4 is a side view of the optical system shown in FIG. 1, with the aberration-correcting lens group removed.

Let us consider the spherical aberration that may occur in the case where the aberration-correcting lens group is removed from the optical system of FIG. 1 as is illustrated in FIG. 4. The thickness error of the objective lens 20 is estimated to be about 10 μm for each lens. The error in adjusting the space between the lenses 20a and 20b composing the objective lens 20 is estimated to be about 10 μm at maximum. Further, the thickness error of the transparent substrate 101 is estimated to be about 10 μm, too. In view of these errors, the spherical aberration will be too large to neglect if the objective lens 20 has a particularly large numerical aperture and if the spherical aberration is not corrected at all.

Figure 5:
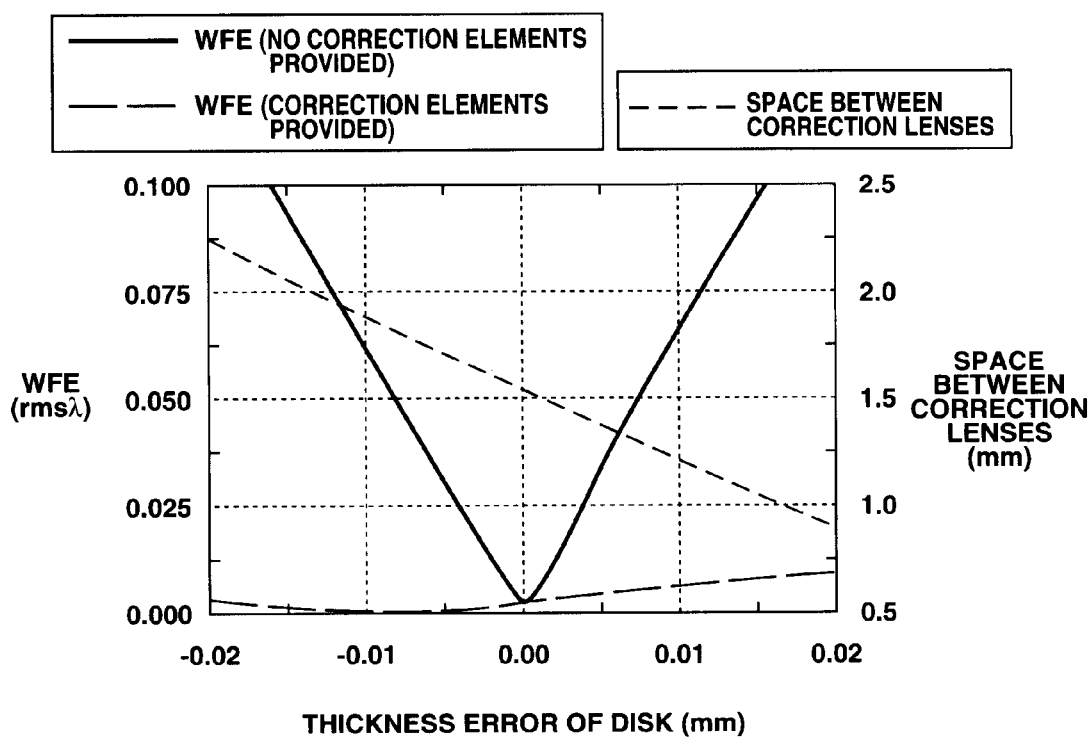
FIG. 5 is a graph illustrating the relation that the distance the aberration-correcting lens group is moves to compensate for the thickness error of the transparent substrate has with the wave-front aberration in the optical system shown in FIG. 1.

The wave-front aberration in the optical system shown in FIG. 4 is 0.002 λ. If the thickness of the transparent substrate 101 changes by ±20 μm, spherical aberration will be generated. This spherical aberration can be well corrected as indicated by the broken line shown in FIG. 5, by moving the first lens of the aberration-correcting lens group 1 used in the optical system of FIG. 1. In FIG. 5, the movement of the aberration-correcting lens group 1 is represented in tents of the space between the lenses that constitute the aberration-correcting lens group.

In this optical system, the wave-front aberration can be sufficiently suppressed by moving the lens of the group 1, which is more remote from the objective lens than the other lens, by a distance Δd defined below, provided that the transparent substrate 101 has a thickness error of approximately ±10 μm.

$$\Delta d = -34.458 \, \Delta t$$

(Δd: the distance one lens of the aberration-correcting lens group is moved, Δt: the thickness error of the transparent substrate)

Generally, the Marchell's criterion regarded as the minimum requirements for good images that have optically reached diffraction limits is wave-front aberration of 0.07 rms(. Hence, the deterioration in image quality, caused by the thickness error of the transparent substrate can be almost negligibly small in this case. If the objective lens has a thickness error or an assembling error concerning the space between the lenses, the space between the lenses of the aberration-correcting lens group is changed in the same way, thereby to correct the spherical aberration. If the spherical aberration is not corrected, aberration too prominent to neglect will remain as is indicated by the solid line in FIG. 5.

In the embodiment shown in FIG. 1, the aberration-correcting lens group 1 is composed of two groups, or two lenses, i.e., the first lens 2 which is a negative lens and the second lens 3 which is a positive lens. Nonetheless, it suffices for the aberration-correcting lens group 1 to have a group having negative power and a group having positive power. Each of these groups may comprise a plurality of lenses. Moreover, the negative lens group and the positive lens group may be arranged in the reverse order. In this case, the spherical aberration generated by adjusting the space between these lens groups has polarity that is determined by the space between the lens groups, not by the order in which the lens groups are arranged.

The aberration-correcting lens group described above may have the function of a collimator. If this is the case, the number of components constituting the optical head can be decreased, making it easy to manufacture the optical head and to lower the manufacturing cost of the optical head.

In the embodiment described above, the optical system is an infinite system in which a collimator lens (not shown) collimates the light beam emitted from the light source, as a special solution to the aberration-correcting lens group. In the infinite optical system, a beam splitter or an anamorphic prism can be easily arranged between collimator lens and the aberration-correcting lens group. Nevertheless, the optical system of the optical head according to this invention can be constructed in the form of a finite system.

In the embodiment described above, the objective lens is one that comprises two lens groups, each consisting of one lens. Instead, the objective lens may comprise three or more lenses.

Figure 6:
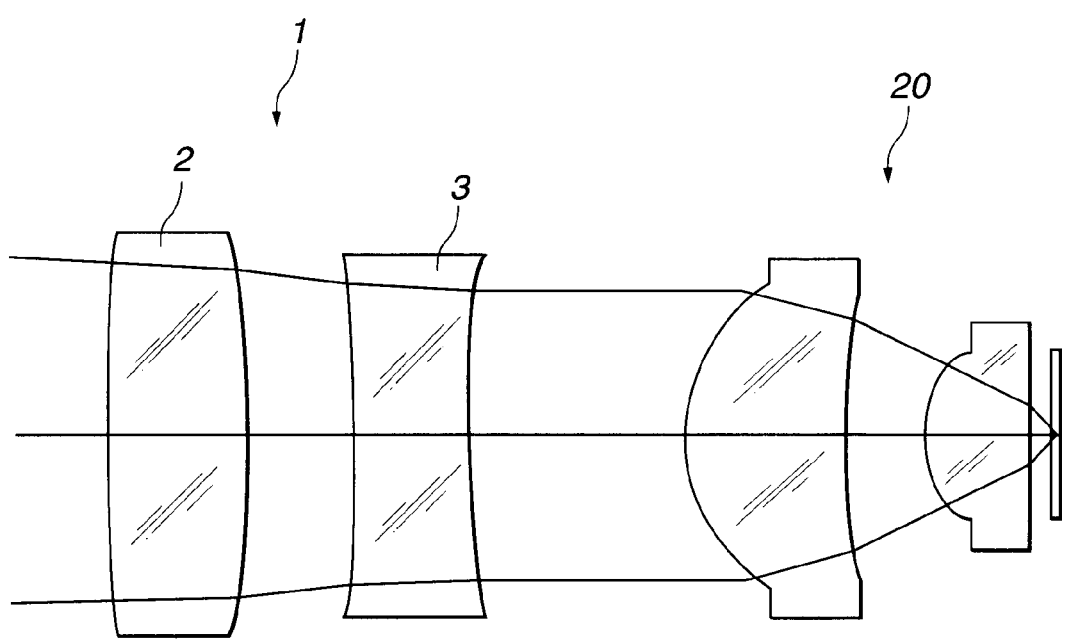
FIG. 6 is a side view of the optical system of an optical head according to the present invention (used a numerical aperture of 0.8 or more)

The optical system of the optical head according to the present invention effectively works to correct spherical aberration, particularly when its objective lens is composed of a plurality of lenses and has a numerical aperture of 0.8 or more. FIG. 6 shows the optical system of an optical head according to the invention, which incorporates an objective lens having a numerical aperture of 0.8. This optical system has the design values shown in the following Table 2.

TABLE 2

| | Objective lens NA/Focal distance/ Entrance pupil φ (0.80/2.648 mm/4.237 mm) | | | Wavelength λ = 660 nm | |
|---|---|---|---|---|---|
| Surface | Radius of curvature (mm) | | Axial interval (mm) | Flexion rate Nd/Abbe number vd at d line | Flexion rate N at 660 nm |
| OBJ | ∞ | | ∞ | | |
| STO | ∞ | | 0.0 | | |
| S1 | R: 19.0 | C: 0.0 | 2.0 | 1.51633/64.1 | 1.514207 |
| | K: 0.0 | D: 0.0 | | | |
| | A: 0.0 | E: 0.0 | | | |
| | B: 0.0 | F: 0.0 | | | |
| S2 | R: −19.0 | C: 0.0 | 1.523091 | | |
| | K: 0.0 | D: 0.0 | | | |
| | A: 0.0 | E: 0.0 | | | |
| | B: 0.0 | F: 0.0 | | | |
| S3 | R: −17.055 | C: 0.0 | 1.6 | 1.620/36.3 | 1.614805 |
| | K: 0.0 | D: 0.0 | | | |
| | A: 0.0 | E: 0.0 | | | |
| | B: 0.0 | F: 0.0 | | | |
| S4 | R: 25.0 | C: 0.0 | 3.0 | | |
| | K: 0.0 | D: 0.0 | | | |
| | A: 0.0 | E: | | | |
| | B: 0.0 | F: | | | |
| S5 | R: 2.43644 | C: $-1.216921 \times 10^{-4}$ | 2.306044 | 1.4955/81.6 | 1.493482 |
| | K: −0.530603 | D: $-.526207 \times 10^{-6}$ | | | |

TABLE 2-continued

| | Objective lens NA/Focal distance/ Entrance pupil φ (0.80/2.648 mm/4.237 mm) | | Wavelength λ = 660 nm | |
|---|---|---|---|---|
| Surface | Radius of curvature (mm) | Axial interval (mm) | Flexion rate Nd/Abbe number vd at d line | Flexion rate N at 660 nm |
| S6 | A: 0.462792 × 10⁻³  E: 0.0<br>B: −.131930 × 10⁻³  F: 0.0<br>R: 19.29810  C: 0.502887 × 10⁻⁴<br>K: −26.403411  D: 0.0 | 1.039076 | | |
| S7 | A: −.838023 × 10⁻³  E: 0.0<br>B: 0.455037 × 10⁻⁴  F: 0.0<br>R: 1.50881  C: 0.579591 × 10⁻²<br>K: −0.198463  D: −.317005 × 10⁻²<br>A: −.999579 × 10⁻²  E: 0.0<br>B: −.127468 × 10⁻²  F: 0.0 | 1.498834 | 1.58913/61.3 | 1.586056 |
| S8 | ∞ | 0.0 | | |
| S9 | ∞ | 0.300751 | | |
| S10 | ∞ | 0.1 | | 1.527000 |
| S11 | ∞ | 0.0 | | |
| IMG | ∞ | 0.0 | | |

FIG. 7A illustrates the spherical aberration occurring in this optical system. FIG. 7B shows the astigmatism occurring in this optical system. FIG. 7C shows the distorted aberration occurring in the optical system. FIG. 8A depicts the lateral aberration occurring at an angle of field of 0.5°. FIG. 8B shows the lateral aberration on the optical axis of the optical system.

Figure 9:
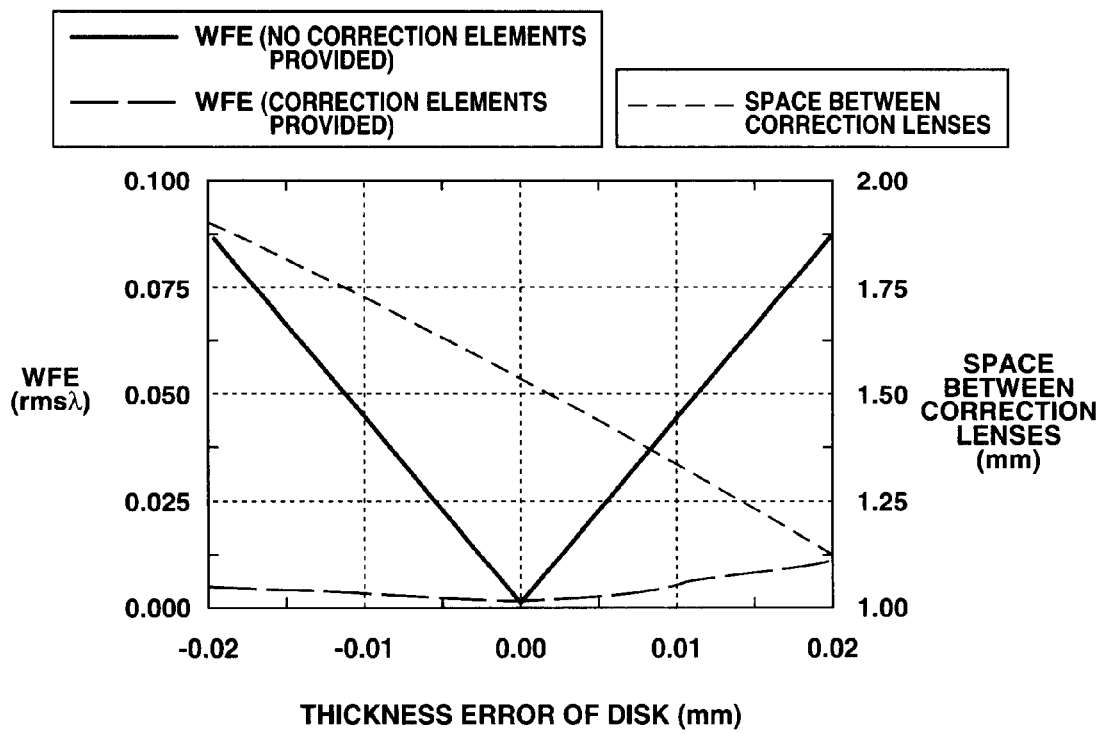
FIG. 9 is a graph illustrating the relation that the distance the aberration-correcting lens group is moves to compensate for the thickness error of the transparent substrate has with the wave-front aberration in the optical system shown in FIG. 6.

The wave-front aberration in the optical system shown in FIG. 6 is 0.001 rmsλ. If the transparent substrate has a thickness error of ±20 μm, spherical aberration will be generated. To correct this spherical aberration well, it suffices to move the aberration-correcting lens group by a predetermined distance as is illustrated in FIG. 9. If the transparent substrate has a thickness error of about ±10 μm, the wave-front aberration generated by this error can be sufficiently suppressed, merely by moving the lenses of the aberration-correcting lens group by Δd defined below.

$$\Delta d = -19.685 \Delta t$$

(Δd: the distance one lens of the aberration-correcting lens group is moved, Δt: the thickness error of the transparent substrate)

If the spherical aberration is not corrected, aberration too prominent to neglect will remain as is indicated by the solid line in FIG. 9. As the equation [1] shows, the larger the numerical aperture, the worse the spherical aberration. Therefore, spherical aberration too large to neglect will occur if the objective lens has a numerical aperture of 0.8 or more and if the spherical aberration is not corrected.

The use of such an optical element described above can suppress spherical aberration. This facilitates the use of a lens having a large NA, making it possible to increase the recording density and storage capacity of the optical recording medium.

As described above, spherical aberration can be sufficiently suppressed in the optical system of the optical head according to the present invention. This renders it easy to use an objective lens having a large numerical aperture. As a result, it is possible to enhance the recording density and storage capacity of the optical recording medium.

Optical Head

Figure 10:
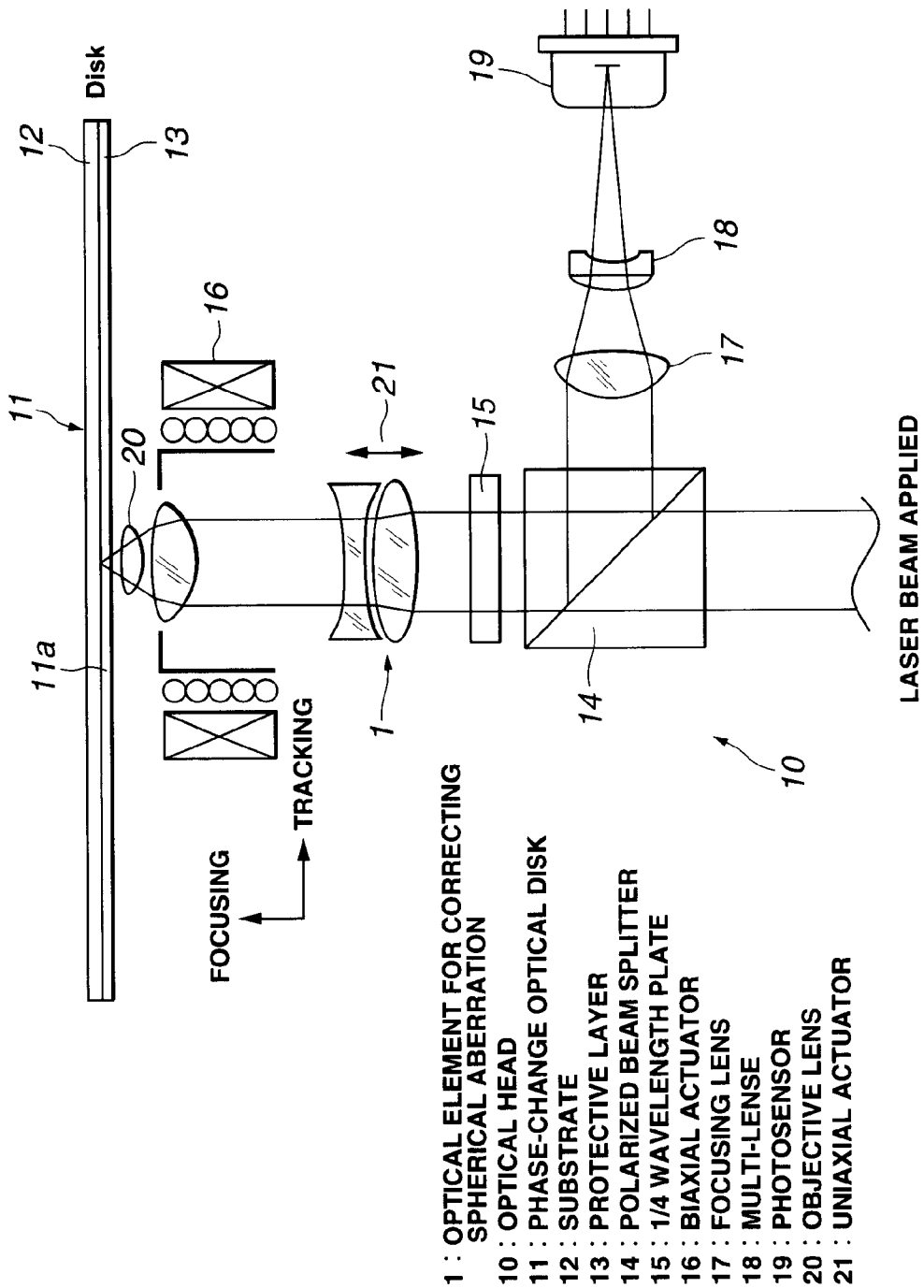
FIG. 10 is a side view showing the structure of an optical head according to the present invention.

The optical head according to this invention comprises such an optical system as has been described above. As shown in FIG. 10, the optical head is designed to record and reproduce data signals on and from an optical recording medium such as a phase-change optical disk 11.

The phase-change optical disk 11, on which the optical head 10 performs the recording and reproducing of data signals, comprises a transparent substrate 12, a signal-recording layer, and a protective layer 13. The substrate 12 has a thickness t2 of, for example, 1.2 mm or 0.6 mm. The signal-recording layer undergoes phase-changes to record data signals. The protective layer 13 has a thickness t3 of, for example, 0.1 mm. Light is applied not to the transparent substrate 12, but to the protective layer 13 that is much thinner than the transparent substrate 12, thereby to record signals on the signal-recording layer or reproducing signals from the signal-recording layer. Nevertheless, the optical head 10 of this invention can used in combination with an optical recording medium whose the transparent substrate 12 receives light so that signals may be recorded on the signal-recording layer or reproduced from the signal-recording layer.

The optical head 10 according to the invention, which is designed to record and reproduce data signals on and from the phase-change optical disk 11, has a light source (not shown) and a collimator lens (not shown, either). The light source may be, for example, a semiconductor laser that emits a linearly polarized laser beam having emission wavelength of 635 nm. The light source emits a laser beam of a specific intensity, in order to reproduce data signals from the phase-change optical disk 11. To record data signals on the phase-change optical disk 11, the light source emits a laser beam whose intensity is modulated in accordance with the data signals.

In the optical head according to the present invention, the wavelength of the laser beam emitted from the light source is not limited a particular value. A semiconductor laser that emits a laser beam having a wavelength shorter than, for example, 635 nm, may be used. If so, it would be desirable to apply a laser beam having a wavelength as short as possible, for the purpose of further increasing the recording density and storage capacity of the optical recording medium. In this case, the spherical aberration can be corrected more effectively. In addition, the present invention can be applied to the case where lenses, each having so large a numerical aperture as will generate spherical aberration of light beams having a wavelength of 635 nm or more.

A diffraction grating diffracts the laser beam emitted from the light source. The light beam is thereby split into a 0th-order beam and a ±first-order beam. The collimator lens (not shown) converts the 0th-order beam and the ±first-order beam, each to a parallel light beam.

The laser beam, made parallel by the collimator lens, is applied to the signal-recording surface 11a of the phase-change optical disk 11, through a polarized beam splitter 14, a ¼-wavelength plate 15, an aberration-correcting lens group 1 and an objective lens 20. The laser beam applied to the phase-change optical disk 11 undergoes circular polarization as it passes through the ¼-wavelength plate 15. The objective lens 20 focuses the laser beam on the signal-recording surface 11a.

A uniaxial actuator 21 can adjust the space between the lens groups that constitute the aberration-correcting lens group 1.

The optical head 10 further comprises a focusing lens 17, a multi-lens 18, and a photosensor 19. The photosensor 19 receives the light beam reflected by the signal-recording layer and applied through the objective lens 20, aberration-correcting lens group 1, polarized beam splitter 14, focusing lens 17 and multi-lens 18.

That is, the incident light beam applied to the signal-recording surface 11a of the phase-change optical disk 11 is reflected by the signal-recording surface 11a and applied back to the optical head. The beam, thus applied back propagates along the optical path, passing through the objective lens 20 and the aberration-correcting lens group 1. Thereafter, the beam is applied to the ¼-wavelength plate 15. As the light beam passes through the ¼-wavelength plate 15, it rotated through 90 from the direction in which it was polarized when applied toward the optical disk. The light beam is thereby converted to a linearly polarized beam. Then beam is then reflected by the reflecting surface of the polarized beam splitter 14.

The beam reflected by the reflecting surface of the polarized beam splitter 14 passes through the focusing lens 17 and the multi-lens 18 and is detected by the photosensor 19. The multi-lens 18 is a lens having a cylindrical incidence plane and a concave emitting plane. The multi-lens 18 imparts astigmatism to the input light beam so that a focus servo signal may be detected by means of the so-called astigmatism method.

The photosensor 19 comprises six photodiodes. Each photodiode outputs an electric signal that corresponds to the intensity of the light beam applied to it. A prescribed operation is performed on the electric signals the photodiodes have output, A focus servo signal and a tracking servo signal are thereby generated.

In other words, the photosensor 19 detects the light beam to which the multi-lens 18 has imparted astigmatism and outputs electric signals form which a focus servo signal can be generated by the so-called astigmatism method. In the optical head 10, the focus servo signal drives a biaxial actuator 16, thus performing a focus servo control.

The photosensor 19 detects the ±first-order beam that has been diffracted and slit by the diffraction grating ±first-order beam. The photosensor 19 outputs an electric signal from which a tracking servo signal can be generated by the so-called three-beam method. In the optical head 10, the tracking servo signal drives the biaxial actuator 16, thereby accomplishing a tracking servo control.

Moreover, the photosensor 19 outputs electric signals, each corresponding to the intensity of the light incident to one photodiode. A prescribed operation is performed on these electric signals so that the electric signals may be reproduced, as data signals, form the from the phase-change optical disk 11.

As described above, the optical system of the optical head 10 according to this invention comprises a lens group for correcting spherical aberration. The lens group can cancel the spherical aberration resulting from the manufacturing errors of the optical system. This makes it easy to use an objective lens having a large numerical aperture. It is therefore possible to increase the recording density and storage capacity of the optical recording medium.

In the embodiment described above, the optical head of the invention is designed to record and reproduce data signals on and from the phase-change optical disk 11. Nonetheless, the optical head can be modified to record and reproduce data signals on and from various types of optical recording media such as a playback optical disk, a magneto-optical disk, an optical card and the like.

Recording/Reproducing Apparatus

Figure 11:
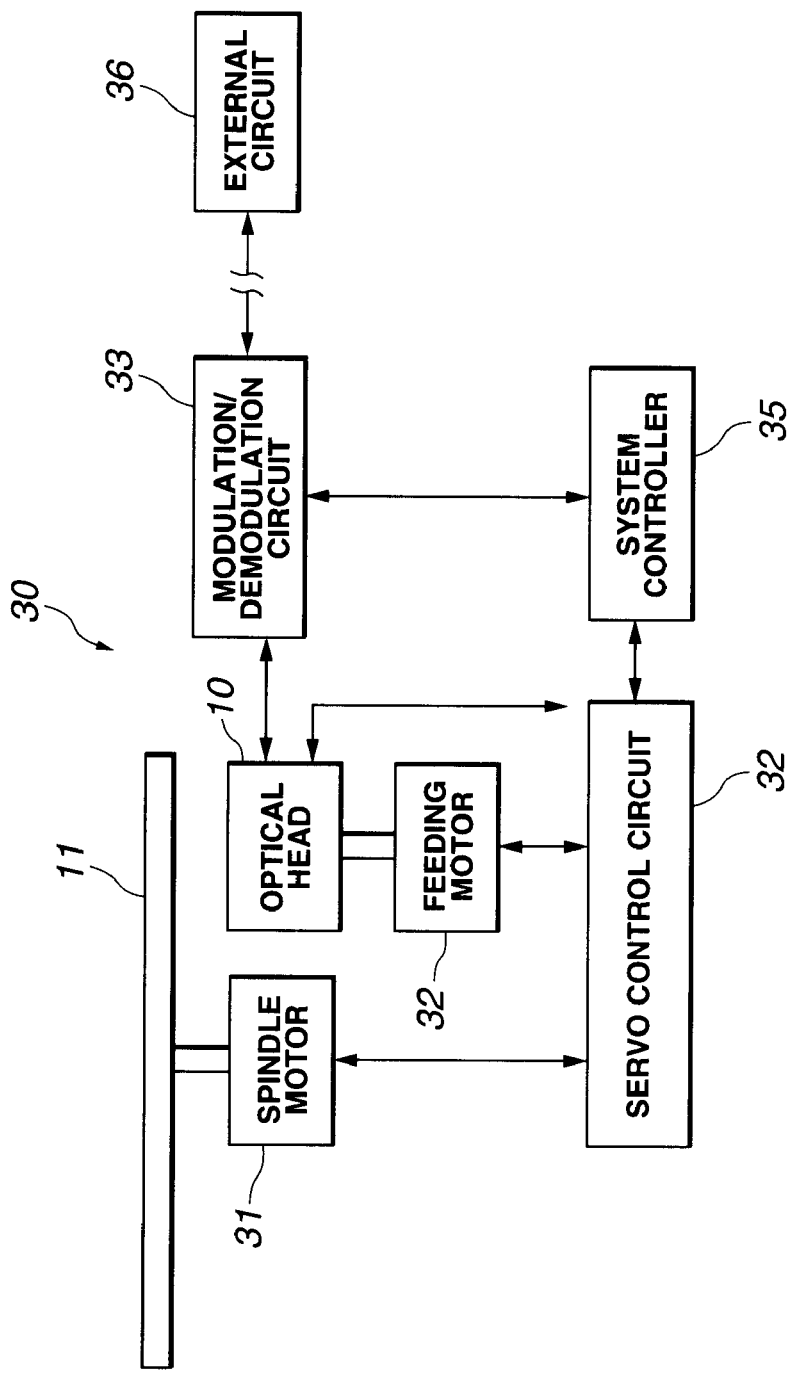
FIG. 11 is a block diagram showing a recording/reproducing apparatus according to this invention.

As shown in FIG. 11, a recording/reproducing apparatus according to this invention is designed to record and reproduce data signals on and from an optical recording medium such as the above-mentioned phase-change optical disk 11. The apparatus comprises the optical head 10 that has been described above.

The recording/reproducing apparatus is designed to record and reproduce data signals on and from the phase-change optical disk 11. Not withstanding this, the apparatus according to the invention can be modified in various modes as a recording/reproducing apparatus that comprises an optical head having an objective lens. That is, the optical recording medium on and from which the apparatus records and reproduces data signals may be playback optical disk, a magneto-optical disk, an optical card or the like.

The recording/reproducing apparatus 30 comprises a spindle motor 31, an optical head 10, a feed motor 32, a modulation/demodulation circuit 33, a servo control circuit 34, and a system controller 35. The spindle motor 31 rotates the phase-change optical disk 11. The optical head 10 is used for recording and reproducing data signals. The feed motor 32 is provided to move the optical head 10 between the inner and outer tracks of the phase-change optical disk 11. The modulation/demodulation circuit 33 effects specific modulation and demodulation. The servo control circuit 34 performs predetermined servo control on the optical head 10. The system controller 35 controls the entire recording/reproducing apparatus 30.

The servo control circuit 34 controls the spindle motor 31, which is driven at a prescribed speed. The phase-change optical disk 11, on and from which data signals will be recorded and reproduced, is chucked to the drive shaft of the spindle motor 31. The spindle motor 31, controlled by the servo control circuit 34, rotates the disk 11 at the prescribed speed.

The optical head 10 applies a laser beam to the phase-change optical disk 11 being rotated, as mentioned above, in order to record data signals on or reproduce data signals from, the phase-change optical disk 11. The head 10 also detects the light beam reflected from the optical disk 11. The optical head 10 is connected to the modulation/demodulation circuit 33. In order to record a data signal, the circuit 33 performs specific modulation on the signal supplied from an external circuit 36. The signal modulated is supplied to the optical head 10. The optical head 10 applies a laser beam to the phase-change optical disk 11. This laser beam has been intensity-modulated in accordance with the signals supplied from the modulation/demodulation circuit 33. To reproduce a data signal, the optical head 10 applies a laser beam of a particular intensity to the phase-change optical disk 11. A signal is reproduced from the light beam reflected from the disk 11. The signal thus reproduced is supplied to the modulation/demodulation circuit 33.

The optical head 10 is connected to the servo control circuit 34, too. At the time of recording or reproducing data signals, a focusing servo signal and a tracking servo signal are generated from the light beam reflected from the phase-change disk 11 which is rotated. These servo signals are supplied to the servo control circuit 34.

The modulation/demodulation circuit 33 is connected to the system controller 35 and the external circuit 36. The modulation/demodulation circuit 33 receives a signal from the external circuit 36 and modulates the signal under the control of the system controller 35, thereby to record the signal on the phase-change optical disk 11. To reproduce a data signal from the phase-change optical disk 11, the modulation/demodulation circuit 33 receives the signal from the optical head 10 and demodulates the signal under the control of the system controller 35. The signal thus demodulated by the circuit 33 is output from the circuit 33 to the external circuit 36.

The feed motor 32 is designed to move the optical head 10 in a radial direction of the phase-change optical disk 11 to a desired position, in order to record or reproduce data signals. The feed motor 32 is driven under the control of the control signal supplied from the servo control circuit 34. That is, the feed motor 32 is connected to the servo control circuit 34, which controls the feed motor 32.

Under the control of the system controller 35, the servo control circuit 34 controls the feed motor 32 such that the optical head 10 moves to a predetermined position where the head 10 opposes the phase-change optical disk 11. The servo control circuit 34 is connected to the spindle motor 31. Thus, it controls the spindle motor 31, too, under the control of the system controller 35. Namely, the servo control circuit 34 controls the spindle motor 32, which drives the phase-change optical disk 11 at the prescribed speed to record data signals on or reproduce data signals from the phase-change optical disk 11.

The servo control circuit 34 is connected to the optical head 10, too. To record a data signal or reproduce the same, the circuit 34 receives the data signal and a servo signal from the optical bead 10. The circuit 34 controls the biaxial actuator 16 mounted on the optical head 10, in accordance with the servo signal. Focus servo control and tracking servo control are thereby accomplished. Further, the circuit 34 controls the uniaxial actuator, whereby the space between the lens groups of the aberration-correcting lens group is adjusted to correct the aberration.

In the recording/reproducing apparatus described above, the aberration-correcting lens group mounted on the optical head 10 cancels the spherical aberration resulting from the manufacture error of the optical system. Hence, it is easy to use an objective lens which comprises a plurality of lenses and which has a large numerical aperture. It is therefore possible to enhance the recording density and storage capacity of the optical recording medium.

Embodiments

Specific embodiments of the optical head according to the present invention will be described below.

Embodiment 1

Figure 12:
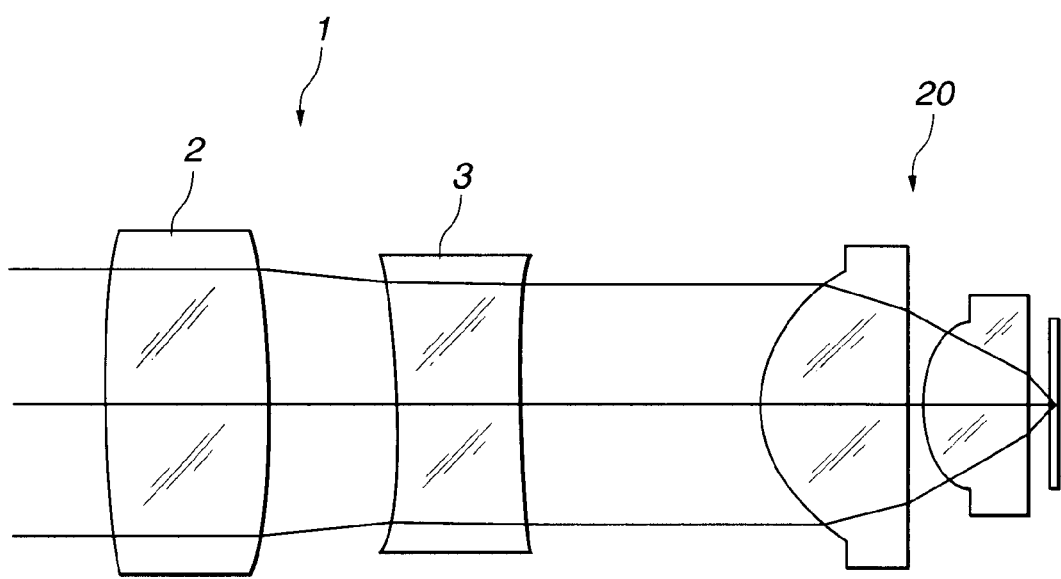
FIG. 12 is a side view showing the structure of an optical system (of Embodiment 1), which has two aberration-correcting lens groups, each composed of two lenses.

FIG. 12 shows the structure of the optical system incorporated in this embodiment. Table 3 presented below shows the values set in the optical system.

TABLE 3

| | Objective lens NA/Focal distance/ | | | Wavelength λ = 635 nm | |
| --- | --- | --- | --- | --- | --- |
| | Entrance pupil φ (0.85/1.765 mm/3.00 mm) | | | Flexion rate Nd/Abbe | Flexion rate N |
| Surface | Radius of curvature (mm) | | Axial interval (mm) | number νd at d line | at 635 nm |
| OBJ | | ∞ | ∞ | | |
| STO | | ∞ | 0.0 | | |
| S1 | R: 19.0 | C: 0.0 | 2.0 | 1.51633/64.1 | 1.15014 |
| | K: 0.0 | D: 0.0 | | | |
| | A: 0.0 | E: 0.0 | | | |
| | B: 0.0 | F: 0.0 | | | |
| S2 | R: −19.0 | C: 0.0 | 1.523091 | | |
| | K: 0.0 | D: 0.0 | | | |
| | A: 0.0 | E: 0.0 | | | |
| | B: 0.0 | F: 0.0 | | | |
| S3 | R: −17.055 | C: 0.0 | 1.6 | 1.620/36.3 | 1.616405 |
| | K: 0.0 | D: 0.0 | | | |
| | A: 0.0 | E: 0.0 | | | |
| | B: 0.0 | F: 0.0 | | | |
| S4 | R: 25.0 | C: 0.0 | 3.0 | | |
| | K: 0.0 | D: 0.0 | | | |
| | A: 0.0 | E: | | | |
| | B: 0.0 | F: | | | |
| S5 | R: 1.62730 | C: −.0.749875 × $10^{-4}$ | 1.639793 | 1.4955/81.6 | 1.494122 |
| | K: −0.505660 | D: −.204775 × $10^{-3}$ | | | |
| | A: −.207368 × $10^{-2}$ | E: 0.0 | | | |
| | B: −.999092 × $10^{-3}$ | F: 0.0 | | | |
| S6 | R: 89.45684 | C: −.332978 × $10^{-2}$ | 0.252358 | | |
| | K: 0.0 | D: 0.921202 × $10^{-3}$ | | | |
| | A: −.291281 × $10^{-2}$ | E: 0.0 | | | |
| | B: 0.459860 × $10^{-2}$ | F: 0.0 | | | |

TABLE 3-continued

| | Objective lens NA/Focal distance/ Entrance pupil φ (0.85/1.765 mm/3.00 mm) | | | Wavelength λ = 635 nm | |
|---|---|---|---|---|---|
| Surface | Radius of curvature (mm) | | Axial interval (mm) | Flexion rate Nd/Abbe number vd at d line | Flexion rate N at 635 nm |
| S7 | R: 1.30215<br>K: −0.503781<br>A: 0.193338 × 10$^{-1}$<br>B: 0.120697 × 10$^{-1}$ | C: 0.206089 × 10$^{-3}$<br>D: 0.0<br>E: 0.0<br>F: 0.0 | 1.314052 | 1.58913/61.3 | 1.587011 |
| S8 | ∞ | | 0.0 | | |
| S9 | ∞ | | 0.149962 | | |
| S10 | ∞ | | 0.1 | | 1.529500 |
| S11 | ∞ | | 0.0 | | |
| IMG | ∞ | | 0.0 | | |

FIG. 13A illustrates the spherical aberration occurring in this optical system. FIG. 13B shows the astigmatism occurring in this optical system. FIG. 13C shows the distorted aberration occurring in the optical system. FIG. 14A depicts the lateral aberration occurring at an angle of field of 0.5°. FIG. 14B shows the lateral aberration on the optical axis of the optical system.

Figure 15:
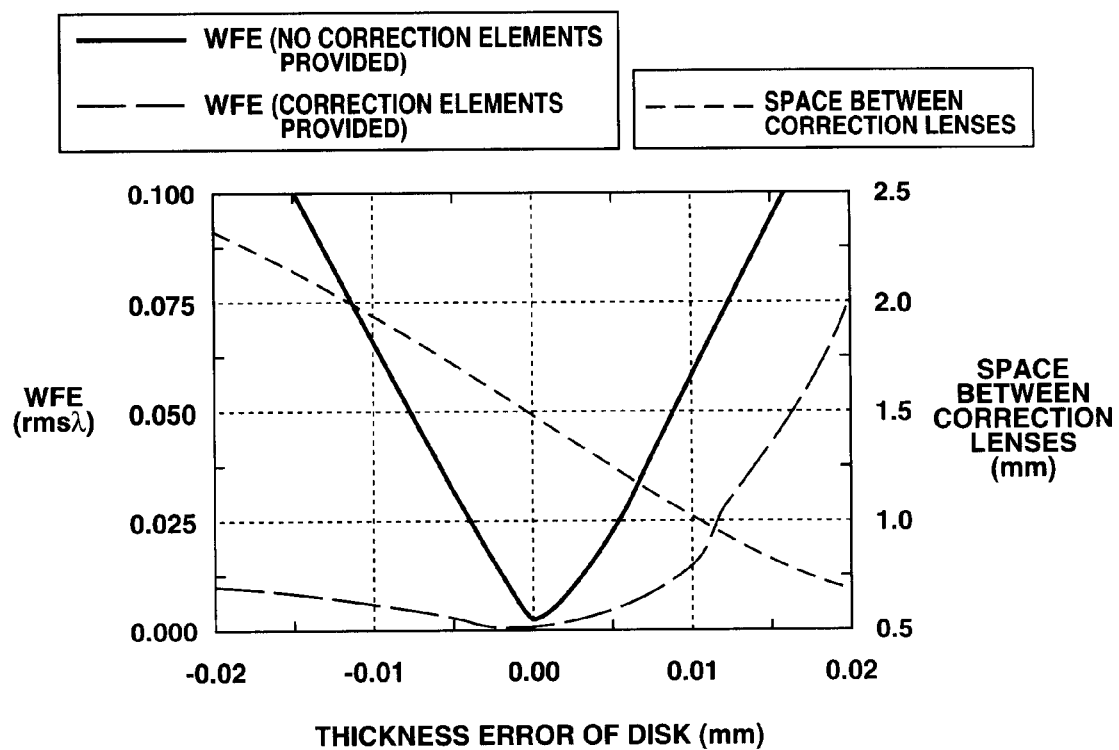
FIG. 15 is a graph illustrating the relation that the distance the aberration-correcting lens group is moves to compensate for the thickness error of the transparent substrate has with the wave-front aberration in the optical system (of Embodiment 1)

The wave-front aberration in this optical system is 0.002 rmsλ. If the transparent substrate has a thickness error of ±20 μm, spherical aberration will be generated. To correct this spherical aberration well, it suffices to move the aberration-correcting lens group by a predetermined distance as is illustrated in FIG. 15. If the transparent substrate has a thickness error of about ±10 μm, the wave-front aberration generated by this error can be sufficiently suppressed, merely by moving the lenses of the aberration-correcting lens group by Δd defined below, as is indicated by the broken line in FIG. 15.

$$\Delta d = -41.438 \, \Delta t$$

(Δd: the distance one lens of the aberration-correcting lens group is moved, Δt: the thickness error of the transparent substrate)

In this case, the spherical aberration resulting from the thickness error of the transparent substrate becomes almost negligible. If a similar error occurs at any component other than the aberration-correcting lens group, however, spherical aberration too large to neglect will remain as indicated by the solid line shown in FIG. 15. Consequently, data signals cannot be recorded or reproduced in a desirable manner.

Embodiment 2

Figure 16:
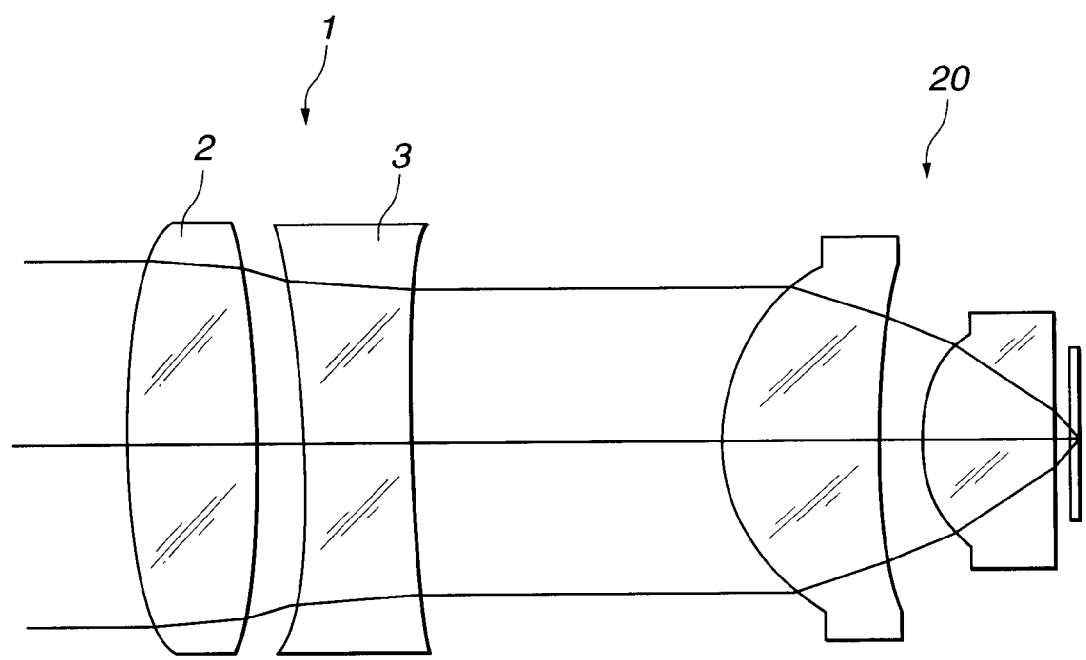
FIG. 16 is a side view of an optical system (of Embodiment 2), which has an aberration-correcting lens groups composed of two lenses, with an air gap between the lenses.

FIG. 16 shows the structure of the optical system incorporated in the present embodiment. Table 4 presented below shows the values set in the optical system.

TABLE 4

| | Objective lens NA/Focal distance/ Entrance pupil φ (0.85/1.765 mm/3.00 mm) | | | Wavelength λ = 410 nm | |
|---|---|---|---|---|---|
| Surface | Radius of curvature (mm) | | Axial interval (mm) | Flexion rate Nd/Abbe number vd at d line | Flexion rate N at 410 nm |
| OBJ | ∞ | | ∞ | | |
| STO | ∞ | | 0.0 | | |
| S1 | R: 7.16382<br>K: 0.0<br>A: 0.0<br>B: 0.0 | C: 0.0<br>D: 0.0<br>E: 0.0<br>F: 0.0 | 1.25 | 1.51633/64.1 | 1.529569 |
| S2 | R: −9.94781<br>K: 0.0<br>A: 0.0<br>B: 0.0 | C: 0.0<br>D: 0.0<br>E: 0.0<br>F: 0.0 | 0.5 | | |
| S3 | R: −9.0<br>K: 0.0<br>A: 0.0<br>B: 0.0 | C: 0.0<br>D: 0.0<br>E: 0.0<br>F: 0.0 | 1.0 | 1.75520/27.5 | 1.803040 |
| S4 | R: 15.0<br>K: 0.0<br>A: 0.0<br>B: 0.0 | C: 0.0<br>D: 0.0<br>E:<br>F: | 3.0 | | |
| S5 | R: 1.6273<br>K: −0.50566<br>A: −.207368 × 10$^{-2}$<br>B: −.999092 × 10$^{-3}$ | C: −.0.749875 × 10$^{-4}$<br>D: −.204775 × 10$^{-3}$<br>E: 0.0<br>F: 0.0 | 1.570619 | 1.4955/81.6 | 1.504869 |
| S6 | R: 89.45684<br>K: 0.0<br>A: −.291281 × 10$^{-2}$<br>B: 0.459860 × 10$^{-2}$ | C: −.332978 × 10$^{-2}$<br>D: 0.921202 × 10$^{-3}$<br>E: 0.0<br>F: 0.0 | 0.350169 | | |
| S7 | R: 1.30215<br>K: −0.503781 | C: 0.206089 × 10$^{-3}$<br>D: 0.0 | 1.278541 | 1.58913/61.3 | 1.604471 |

TABLE 4-continued

| | | Objective lens NA/Focal distance/ | | Wavelength λ = 410 nm | |
|---|---|---|---|---|---|
| | | Entrance pupil φ (0.85/1.765 mm/3.00 mm) | | Flexion rate Nd/Abbe | Flexion rate N |
| Surface | | Radius of curvature (mm) | Axial interval (mm) | number vd at d line | at 410 nm |
| S8 | A: $0.193338 \times 10^{-1}$<br>B: $0.120697 \times 10^{-1}$<br>R: ∞<br>K: 0.0<br>A: 0.0<br>B: 0.0 | E: 0.0<br>F: 0.0<br>C: 0.0<br>D: 0.0<br>E: 0.0<br>F: 0.0 | 0.0 | | |
| S9 | | ∞ | 0.134864 | | |
| S10 | | ∞ | 0.1 | 1.51633/64.1 | 1.529569 |
| S11 | | ∞ | 0.0 | | |
| IMG | | ∞ | 0.0 | | |

Figure 17A:
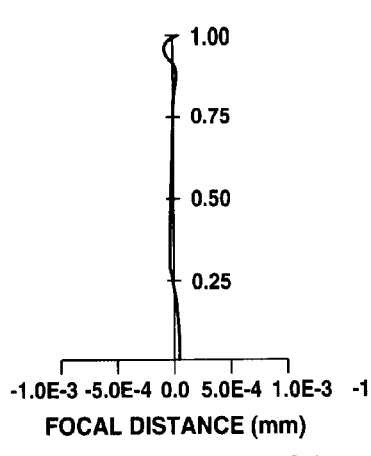
FIG. 17A is a graph illustrating the spherical aberration occurring in the optical system (of Embodiment 2)
Figure 17B:
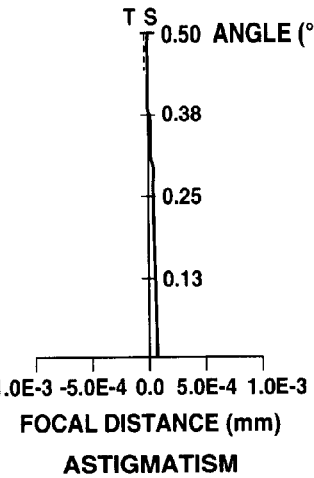
FIG. 17B is a graph illustrating the astigmatism occurring in the optical system (of Embodiment 2)
Figure 17C:
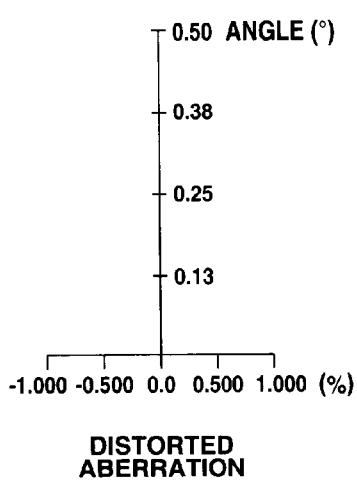
FIG. 17C is a graph illustrating the distorted aberration occurring in the optical system (of Embodiment 2)
Figure 18A:
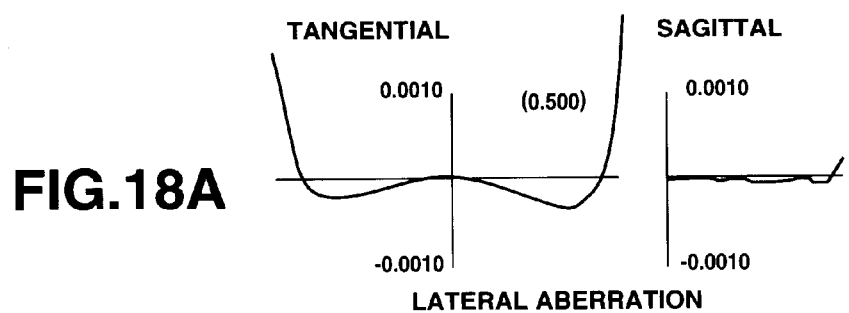
FIG. 18A is a graph represents the lateral aberration occurring at an angle of field of 0.5° in the optical system (of Embodiment 2)
Figure 18B:
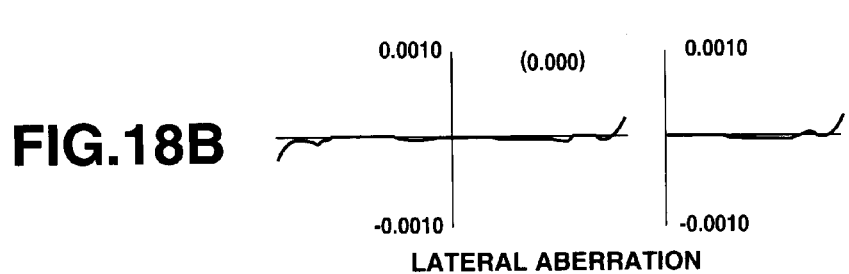
FIG. 18B is a graph showing the lateral aberration on the optical axis of the optical system (of Embodiment 2)

FIG. 17A illustrates the spherical aberration occurring in this optical system. FIG. 17B shows the astigmatism occurring in this optical system. FIG. 17C shows the distorted aberration occurring in the optical system. FIG. 18A depicts the lateral aberration occurring at an angle of field of 0.5°. FIG. 18B shows the lateral aberration on the optical axis of the optical system.

Figure 19:
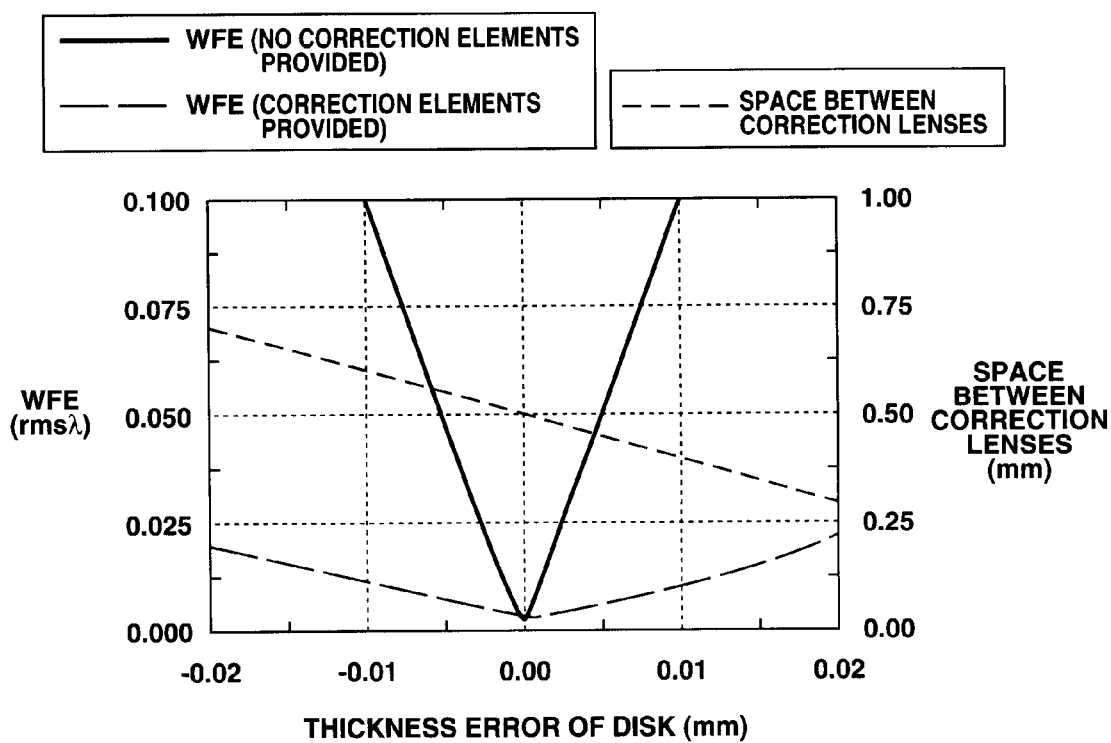
FIG. 19 is a graph illustrating the relation that the distance the aberration-correcting lens group is moves to compensate for the thickness en-or of the transparent substrate has with the wave-front aberration in the optical system (of Embodiment 2)

The wave-front aberration in this optical system is 0.003 rmsλ. If the transparent substrate has a thickness error of ±20 μm, spherical aberration will be generated. To correct this spherical aberration well, it suffices to move the aberration-correcting lens group by a predetermined distance as is illustrated in FIG. 19. If the transparent substrate has a thickness error of about ±10 μm, the wave-front aberration generated by this error can be sufficiently suppressed, merely by moving the lenses of the aberration-correcting lens group by Δd defined below.

$$\Delta d = -10.003 \, \Delta t$$

(Δd: the distance one lens of the aberration-correcting lens group is moved, Δt: the thickness error of the transparent substrate)

In this case, the spherical aberration resulting from the thickness error of the transparent substrate becomes almost negligible. If a similar error occurs at that section of the optical system which includes the aberration-correcting lens group, however, spherical aberration too large to neglect will remain as indicated by the solid line shown in FIG. 19. Consequently, data signals cannot be recorded or reproduced in a desirable manner.

Figure 20:
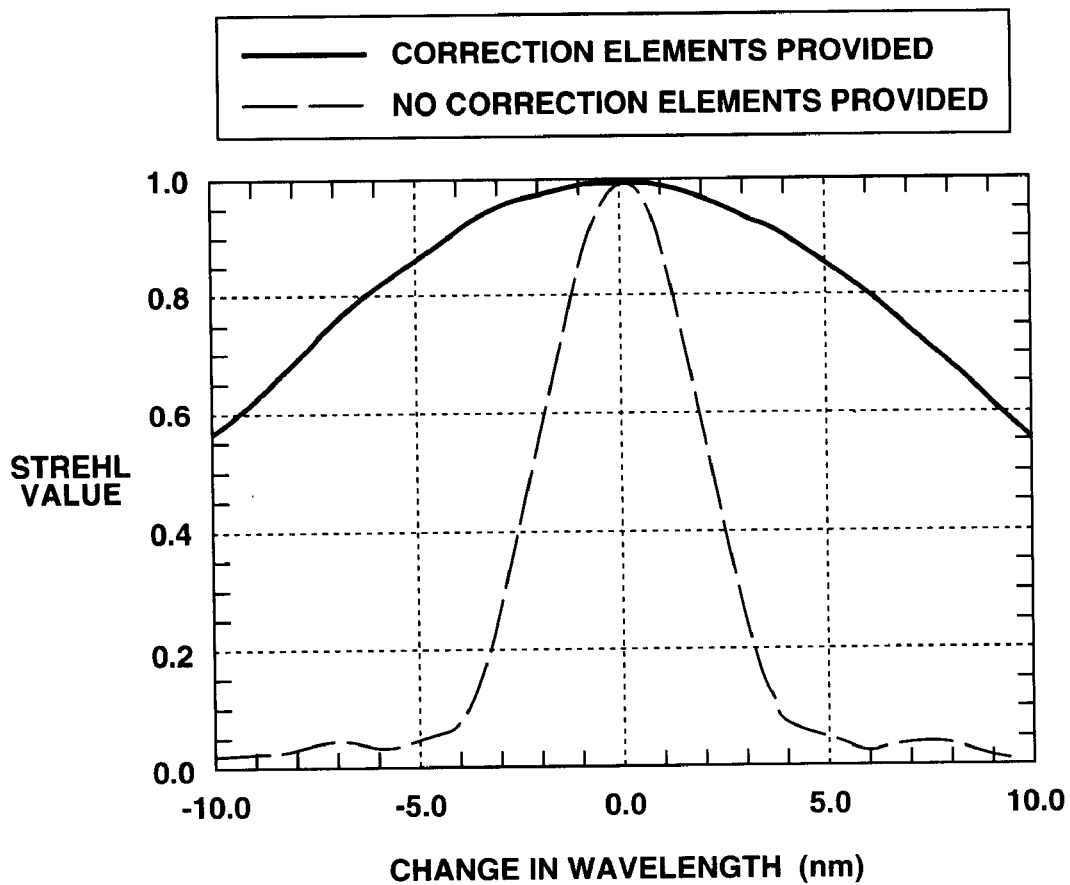
FIG. 20 is a graph showing how the Strehl value changes with the change in wavelength in the optical system (of Embodiment 2)

In this embodiment, the light source uses a wavelength of 400 nm. Hence, chromatic aberration may become a problem. FIG. 20 shows how the Strehl value changes with the change in wavelength in the case where an aberration-correcting lens group is provided and in the case where no aberration-correcting lens group is provided. If an aberration-correcting lens group is provided, the Strehl value is 0.8 or more when the wavelength changes by ±5 nm, and good results are obtained. In no aberration-correcting lens group is provided, the Strehl value is less than 0.8, much affected by the chromatic aberration. This will adversely influence the recording and reproduction of signals.

That is, the aberration-correcting lens group can correct the chromatic aberration occurring at another optical surface since it comprises two lens groups, the first group consisting a positive lens having an Abbe number of 55 or more and the second group consisting of a negative lens having an Abbe number of 35 or less. Thus, the aberration-correcting lens group functions as an element for correcting chromatic aberration, too.

Embodiment 3

Figure 21:
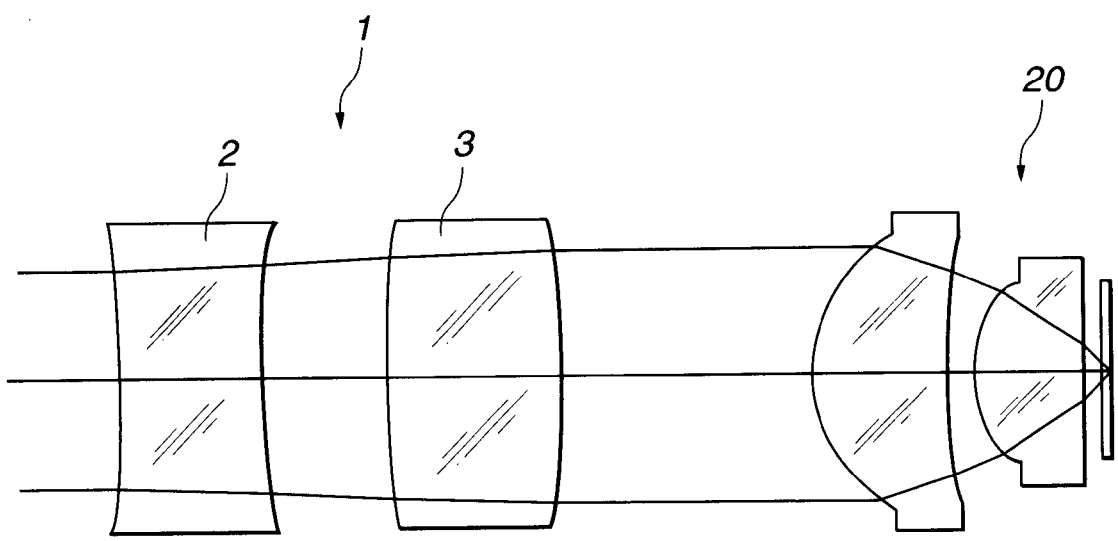
FIG. 21 is a side view of an optical system (of Embodiment 3), which has an aberration-correcting lens groups composed of two lenses, with an air gap between the lenses.

FIG. 21 illustrates the structure of the optical system incorporated in this embodiment. Table 5 presented below shows the values set in the optical system.

TABLE 5

| | | Objective lens NA/Focal distance/ | | Wavelength λ = 635 nm | |
|---|---|---|---|---|---|
| | | Entrance pupil φ (0.85/1.765 mm/3.00 mm) | | Flexion rate Nd/Abbe | Flexion rate N |
| Surface | | Radius of curvature (mm) | Axial interval (mm) | number vd at d line | at 635 nm |
| OBJ | | ∞ | ∞ | | |
| STO | | ∞ | 0.0 | | |
| S1 | R: −25.0<br>K: 0.0<br>A: 0.0<br>B: 0.0 | C: 0.0<br>D: 0.0<br>E: 0.0<br>F: 0.0 | 1.6 | 1.620/36.3 | 1.616405 |
| S2 | R: 17.055<br>K: 0.0<br>A: 0.0<br>B: 0.0 | C: 0.0<br>D: 0.0<br>E: 0.0<br>F: 0.0 | 1.523914 | | |
| S3 | R: 19.0<br>K: 0.0<br>A: 0.0<br>B: 0.0 | C: 0.0<br>D: 0.0<br>E: 0.0<br>F: 0.0 | 2.0 | | |

TABLE 5-continued

| | Objective lens NA/Focal distance/ Entrance pupil φ (0.85/1.765 mm/3.00 mm) | | | Wavelength λ = 635 nm | |
|---|---|---|---|---|---|
| Surface | Radius of curvature (mm) | | Axial interval (mm) | Flexion rate Nd/Abbe number νd at d line | Flexion rate N at 635 nm |
| S4 | R: −19.0<br>K: 0.0<br>A: 0.0<br>B: 0.0 | C: 0.0<br>D: 0.0<br>E:<br>F: | 3.0 | | |
| S5 | R: 1.62730<br>K: −0.505660<br>A: −.207368 × 10$^{-2}$<br>B: −.999092 × 10$^{-3}$ | C: −.0.749875 × 10$^{-4}$<br>D: −.204775 × 10$^{-3}$<br>E: 0.0<br>F: 0.0 | 1.641523 | 1.4955/81.6 | 1.494122 |
| S6 | R: 89.45684<br>K: 0.0<br>A: −.291281 × 10$^{-2}$<br>B: 0.459860 × 10$^{-2}$ | C: −.332978 × 10$^{-2}$<br>D: 0.921202 × 10$^{-3}$<br>E: 0.0<br>F: 0.0 | 0.249421 | | |
| S7 | R: 1.30215<br>K: −0.503781<br>A: 0.193338 × 10$^{-1}$<br>B: 0.120697 × 10$^{-1}$ | C: 0.206089 × 10$^{-3}$<br>D: 0.0<br>E: 0.0<br>F: 0.0 | 1.314798 | 1.58913/61.3 | 1.587011 |
| S8 | ∞ | | 0.0 | | |
| S9 | ∞ | | 0.149333 | | |
| S10 | ∞ | | 0.1 | 1.51633/64.1 | 1.515014 |
| S11 | ∞ | | 0.0 | | |
| IMG | ∞ | | 0.0 | | |

FIG. 22A illustrates the spherical aberration occurring in this optical system. FIG. 22B shows the astigmatism occurring in this optical system. FIG. 22C shows the distorted aberration occurring in the optical system. FIG. 23A depicts the lateral aberration occurring at an angle of field of 0.5°. FIG. 23B shows the lateral aberration on the optical axis of the optical system.

The wave-front aberration in this optical system is 0.002 rmsλ. If the wavelength used changes from 700 nm to 400 nm, spherical aberration will be generated by this error. To correct this spherical aberration, it suffices to move the aberration-correcting lens group by a predetermined distance as is illustrated in FIG. 24.

Figure 24:
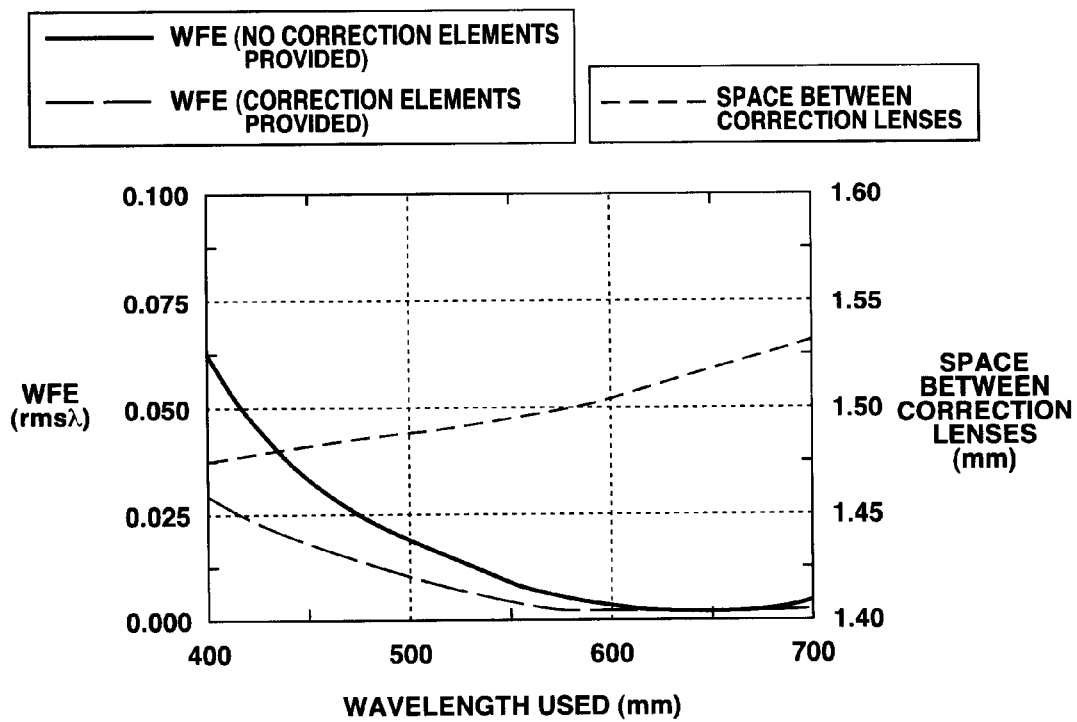
FIG. 24 is a graph illustrating the relation that the distance the aberration-correcting lens group is moves to compensate for the thickness error of the transparent substrate has with the wave-front aberration in the optical system (of Embodiment 3)
Figure 25:
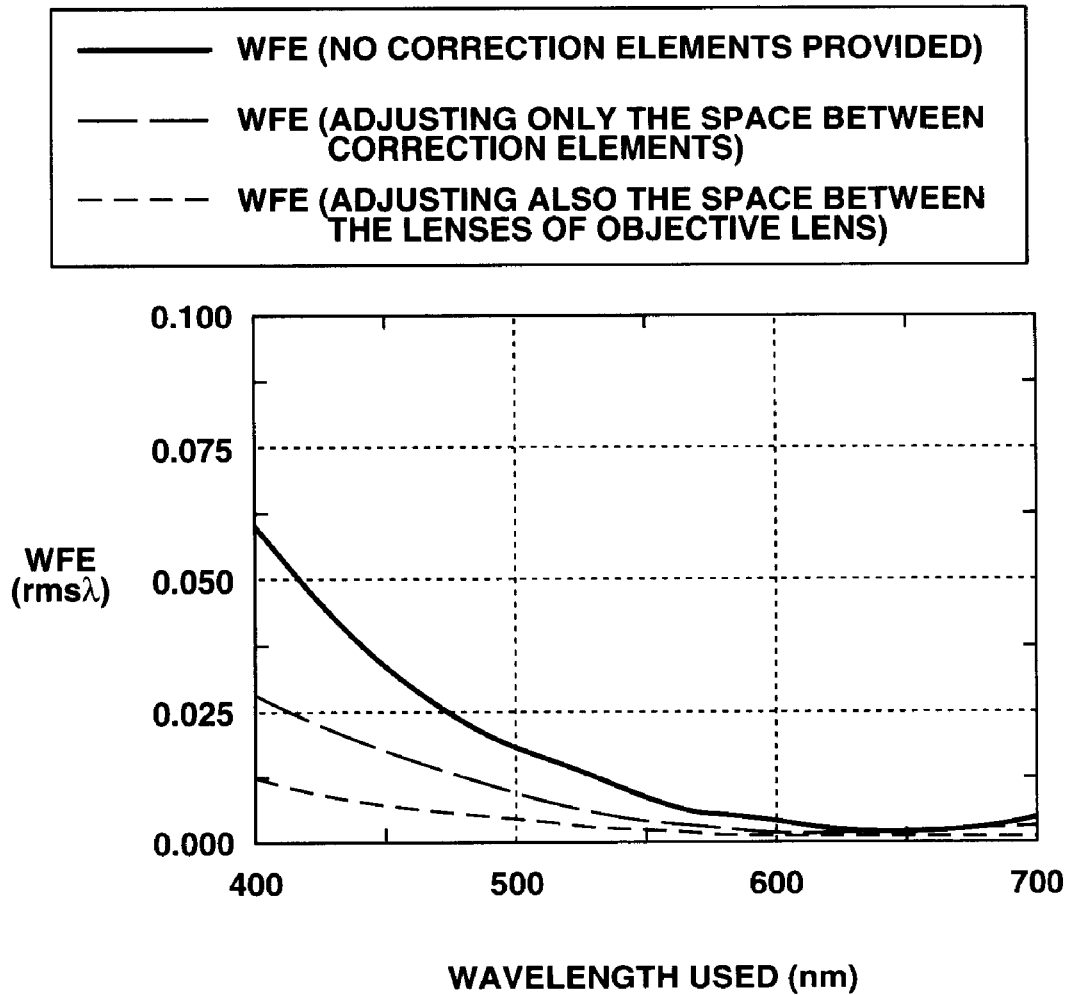
FIG. 25 is a graph representing the wave-front aberration observed in the optical system (of Embodiment 3) when both the aberration-correcting lens group and the objective lens correct the spherical aberration resulting from the change in the wavelength used.

As seen from FIG. 24, the wave-front aberration caused by a change in the wavelength used is corrected much more than in the case there is provided no aberration-correcting lens group. It is not corrected sufficiently, however, at short-wavelength. FIG. 25 shows the wave-front aberration observed when both the space between the lens groups of the objective lens and the space between the lens groups of aberration-correcting lens group are adjusted, thereby correcting the wave-front aberration with high precision. As can be understood from FIG. 25, the aberration is sufficiently suppressed even if the wavelength changes to 400 nm.

Figure 26:
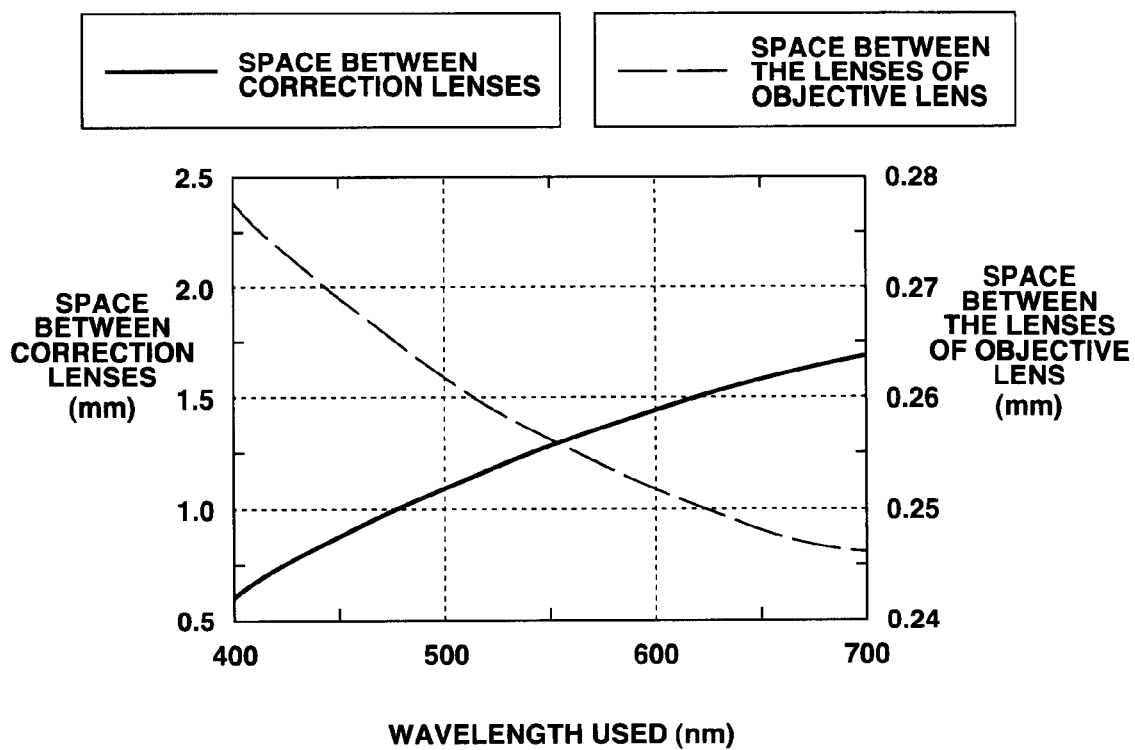
FIG. 26 is a graph showing the inter-lens distances observed in the optical system (of Embodiment 3) when both the aberration-correcting lens group and the objective lens correct the spherical aberration resulting from the change in the wavelength used.

FIG. 26 shows how the space between the lens groups of the aberration-correcting lens group and the space between the lens groups of the objective lens change. An extremely complex structure would be required to adjust, at the same time, the space between the lens groups of the aberration-correcting lens group and the space between the lens groups of the objective lens change. Hence, it is desirable to apply the changes in the aberration shown in FIG. 26, thereby adjusting the space between the lens groups of the objective lens beforehand, and then to adjust the space between the lens groups of the aberration-correcting lens group, thereby correcting the remaining aberration.

In the present embodiment, both the space between the lens groups of the objective lens and the space between the lens groups of the aberration-correcting lens group are adjusted, accomplishing high-precision correction of aberration. Such high-precision correction can be effectively applied also to the case where not only the change in the wavelength used, but also the manufacturing error of the lenses and the like is too large to be corrected by the aberration-correcting lens group alone.

As is clear from the above description, in an optical head comprising an objective lens having a large numerical aperture of 0.8, an aberration-correcting lens group can sufficiently correct spherical aberration, if any, resulting from the manufacturing errors or the like, and also chromatic aberration, if any, resulting from the use of a light source of a short wavelength. The present invention can provide a recording/reproducing apparatus that has such an optical head.

Thus, the present invention can serve to enhance the recording density and storage capacity of an optical recording medium.

What is claimed is:

1. An optical head characterized by comprising:
   a light source;
   an objective lens composed of at least two lenses and having a numerical aperture of at least 0.80;
   an aberration-correcting lens group arranged between the light source and the objective lens and composed of a positive lens group and a negative lens group;
   wherein the light source is a semiconductor laser having an emission wavelength of at most 440 nm:
   wherein the objective lens is made of vitreous material having an Abbe number of at most 95.0 at d line and has a focal distance of at least 1.4 mm; and
   wherein the aberration-correcting lens group corrects spherical aberration occurring at each optical surface of an optical system and chromatic aberration resulting from the wavelength of the light source, as a space between the positive lens group and negative lens group which constitute the aberration-correcting lens group is changed in an axial direction.

2. The optical head according to claim 1, characterized by further comprising an actuator for changing the space between the positive lens group and negative lens group which constitute the aberration-correcting lens group, in an axial direction.

3. The optical head according to claim 1, characterized in that the objective lens is composed of two groups each consisting of at least two lenses.

4. The optical head according to claim 3, characterized by further comprising an actuator for changing the space between the positive lens group and negative lens group which constitute the aberration-correcting lens group, in an axial direction.

5. An optical head characterized by comprising:

a light source;

an objective lens composed of at least two lenses and having a numerical aperture of at least 0.80.

an aberration-correcting lens group arranged between the light source and the objective lens and composed of a positive lens group and a negative lens group;

wherein the aberration-correcting lens group corrects spherical aberration occurring at each optical surface of an optical system, as a space between the positive lens group and negative lens group which constitute the aberration-correcting lens group is changed in an axial direction, wherein the light source is a semiconductor laser having an emission wavelength of at most 440 nm, the objection lens is made of vitreous material having an Abbe number of at most 95.0 at d line and has a focal distance of at least 1.4 mm, and the aberration-correcting lens group is composed of a positive lens having an Abbe number of at least 55 and a negative lens having an Abbe number of at most 35.

6. The optical head according to claim 5, characterized by further comprising an actuator for changing the space between the positive lens group and negative lens group which constitute the aberration-correcting lens group, in an axial direction.

7. The optical head according to claim 5, characterized in that a space between the lens group which constitute the objective lens is changed in an axial direction to correct the spherical aberration occurring at each optical surface of the optical system, in cooperation with the aberration-correcting lens group.

8. The optical heading according to claim 7, characterized by further comprising an actuator for changing, in the axial direction, the space between the positive lens group and negative lens group which constitute the aberration-correcting lens group and the space between the lens groups which constitute the objective lens.

9. A recording/reproducing apparatus characterized by comprising:

a light source;

an objective lens composed of at least two lenses and having a numerical aperture of at least 0.80;

an aberration-correcting lens group arranged between the light source and the objective lens and composed of a positive lens group and a negative lens group;

wherein the light source is a semiconductor laser having an emission wavelength of at most 440 nm:

wherein the objective lens is made of vitreous material having an Abbe number of at most 95.0 at d line and has a focal distance of at least 1.4 mm:

an actuator for changing a space between the positive lens group and negative lens group which constitute the aberration-correcting lens group, in an axial direction; and a photosensor for detecting a light beam emitted from the light source, focused by the objective lens on an optical recording medium and reflected by the optical recording medium, wherein the aberration-correcting lens group corrects spherical aberration occurring at each optical surface of an optical system and chromatic aberration resulting from the wavelength of the light source, as a space between the positive lens group and negative lens group which constitute the aberration-correcting lens group is changed in an axial direction.

10. The recording/reproducing apparatus according to claim 9, characterized in that the objective lens is composed of two groups each consisting of at least two lenses.

11. A recording/reproducing apparatus characterized by comprising:

a light source;

an objective lens composed of at least two lenses and having a numerical aperture of at least 0.80;

an aberration-correcting lens group arranged between the light source and the objective lens and composed of a positive lens group and a negative lens group;

an actuator for changing a space between the positive lens group and negative lens group which constitute the aberration-correcting lens group, in an axial direction; and a photosensor for detecting a light beam emitted from the light source, focused by the objective lens on an optical recording medium and reflected by the optical recording medium, wherein the aberration-correcting lens group corrects spherical aberration occurring at each optical surface of an optical system, as a space between the positive lens group and negative lens group which constitute the aberration-correcting lens group is changed in an axial direction wherein the light source is a semiconductor laser having an emission wavelength of at most 440 nm, the objective lens is made of virtreous material having an Abbe number of at most 95.0 at d line and has a focal distance of at least 1.4 mm, and the aberration-correcting lens group is composed of a positive lens having an Abbe number of at least 55 and a negative lens having an Abbe number of at most 35.

12. The recording/reproducing apparatus according to claim 11, characterized in that a space between the lens groups which constitute the objective lens is changed in the axial direction to correct the spherical aberration occurring at each optical surface of the optical system, in cooperation with the aberration-correcting lens group, and the actuator changes, in the axial direction, not only the space between the positive lens group and negative lens group which constitute the aberration-correcting lens group, but also the space between the lens groups which constitute the objective lens.

* * * * *